United States Patent
Nose

(10) Patent No.: US 9,660,253 B2
(45) Date of Patent: *May 23, 2017

(54) POSITIVE ELECTRODE ACTIVE MATERIAL FOR SODIUM BATTERY, AND METHOD OF PRODUCING THE SAME

(75) Inventor: Masafumi Nose, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/241,188

(22) PCT Filed: Jun. 13, 2012

(86) PCT No.: PCT/JP2012/065096
§ 371 (c)(1),
(2), (4) Date: Feb. 26, 2014

(87) PCT Pub. No.: WO2013/031331
PCT Pub. Date: Mar. 7, 2013

(65) Prior Publication Data
US 2014/0197358 A1     Jul. 17, 2014

(30) Foreign Application Priority Data
Aug. 29, 2011   (JP) .................. 2011-186131

(51) Int. Cl.
*H01M 4/04*   (2006.01)
*H01M 4/58*   (2010.01)
*C01B 25/45*   (2006.01)
*H01M 10/054*   (2010.01)

(52) U.S. Cl.
CPC ........... *H01M 4/0471* (2013.01); *C01B 25/45* (2013.01); *H01M 4/5825* (2013.01); *H01M 10/054* (2013.01)

(58) Field of Classification Search
None
See application file for complete search history.

(56) References Cited

U.S. PATENT DOCUMENTS

| | | | |
|---|---|---|---|
| 6,068,949 A | 5/2000 | Shackle | |
| 6,200,704 B1* | 3/2001 | Katz | H01M 4/02 429/218.1 |
| 6,872,492 B2* | 3/2005 | Barker | C01B 25/455 429/231.2 |
| 2005/0136331 A1 | 6/2005 | Jouanneau-Si Larbi et al. | |
| 2008/0213674 A1 | 9/2008 | Okada et al. | |
| 2010/0035155 A1 | 2/2010 | Okada et al. | |
| 2011/0086266 A1 | 4/2011 | Kondo | |
| 2012/0021273 A1 | 1/2012 | Ohmori et al. | |
| 2012/0199785 A1 | 8/2012 | Saka | |
| 2014/0197358 A1 | 7/2014 | Nose | |
| 2015/0180024 A1 | 6/2015 | Nose | |
| 2015/0280215 A1 | 10/2015 | Nose | |

FOREIGN PATENT DOCUMENTS

| | | |
|---|---|---|
| CA | 2 750 707 A1 | 12/2002 |
| CN | 1630126 A | 6/2005 |
| CN | 1677718 A | 10/2005 |
| CN | 101558518 A | 10/2009 |
| CN | 102509789 A | 6/2012 |
| EP | 2752925 A1 | 7/2014 |
| JP | A-2004-158348 | 6/2004 |
| JP | A-2005-183395 | 7/2005 |
| JP | 2008-260666 A | 10/2008 |
| JP | 2010-260761 A | 11/2010 |
| KR | 10-2014-0041911 A | 4/2014 |
| WO | 02/097907 A2 | 12/2002 |
| WO | 2005/043647 A2 | 5/2005 |
| WO | 2009/053823 A2 | 4/2009 |
| WO | 2010/110465 A1 | 9/2010 |
| WO | 2011/038499 A1 | 4/2011 |
| WO | 2011/043482 A1 | 4/2011 |
| WO | 2013/031331 A1 | 3/2013 |
| WO | 2013/045905 A1 | 4/2013 |

OTHER PUBLICATIONS

Kim et al. New Iron Based Mixed Polyanion Cathodes for Lithium and Sodium Rechargeable Batteries: Combined First Principles Calculations and Experimental Study. Journal of the American Chemical Society. Jun. 5, 2012. 134, 10369-10372.*

Essehli et al. Synthesis, crystal structure and infrared spectroscopy of a new non-centrosymmetric mixed-anion phosphate Na4Mg3(PO4)2(P2O7). Journal of Alloys and Compounds. 493 (2010) 654-660.*

Trad et al., "A Layered Iron(III) Phosphate Phase, Na3Fe3(PO4)4: Synthesis, Structure, and Electrochemical Properties as Positive Electrode in Sodium Batteries", Journal of Physical Chemistry C, Jun. 3, 2010, pp. 10034-10044, vol. 114, No. 21.

Kuroda et al., "Electrochemical Properties of Spinel-type Oxide Anodes in Sodium-Ion Battery," *The Electrochemical Society*, Abstract #389, 218th ECS Meeting, 2010.

(Continued)

*Primary Examiner* — Tanisha Diggs
(74) *Attorney, Agent, or Firm* — Oliff PLC

(57) ABSTRACT

The invention provides a positive electrode active material for sodium batteries which has a high working potential and can be charged and discharged at a high potential. The invention also provides a method of producing such a positive electrode active material, with this positive electrode active material for sodium batteries being represented by general formula (1) below:

$$Na_xM_y(AO_4)_z(P_2O_7)_w \qquad (1)$$

(wherein M is at least one selected from the group consisting of titanium, vanadium, chromium, manganese, iron, cobalt, nickel, copper and zinc; A is at least one selected from the group consisting of aluminum, silicon, phosphorus, sulfur, titanium, vanadium and tungsten; x satisfies the condition $4 \geq x \geq 2$; y satisfies the condition $4 \geq y \geq 1$, z satisfies the condition $4 \geq z \geq 0$; w satisfies the condition $1 \geq w \geq 0$; and one or both of z and w is 1 or more).

7 Claims, 11 Drawing Sheets

(56) References Cited

OTHER PUBLICATIONS

Didier et al., "Study of the $Na_xVO_2$ phases: structure and electrochemistry," *LiBD-5 2011-Electrode materials*, 2011.
Komaba et al., "Electrochemical intercalation activity of layered $NaCrO_2$ vs. $LiCrO_2$," *Electrochemistry Communications*, 2010, vol. 12, pp. 355-358.
Berthelot et al., "Electrochemical investigation of the $P2-Na_xCoO_2$ phase diagram," *Nature Materials*, Jan. 2011, vol. 10, pp. 74-80.
Ogumi, "Richiumu niji-denchi (Lithium secondary batteries)," 2008, p. 77-81.
Sanz et al., "Synthesis, Structural Characterization, Magnetic Properties, and Ionic Conductivity of $Na4MII3(PO4)2(P2O7)(MII=Mn, Co, Ni)$", Chem. Mater,2001,vol. 13, 1334-1340.
Partial Translation of Jun. 12, 2015 Office Action issued in Korean Patent Application No. 2014-7005138.
Sanz et al., "Crystal Structure, Magnetic Properties, and Ionic Conductivity of a New Mixed-Anion Phosphate $Na4Ni5(PO4)2(P2O7)2$," Chemistry of Materials, vol. 11, No. 10, Oct. 1, 1999, pp. 2673-2679.
Sanz et al., "$Na4Co3(PO4)2P2O7$, a New Sodium Cobalt Phosphate Containing a Three-Dimensional System of Large Intersecting Tunnels," Journal of Solid State Chemistry, 123, pp. 129-139 (1996).
Barker et. al., "$Li4/3$ $Ti$ $5/3$ $O4$ ‖ $Na3V2(PO4)2F3$: An Example of a Hybrid-Ion Cell Using a Non-graphitic Anode" Journal of the Electrochemical Society, 2007, vol. 154, No. 9, pp. A882-A887.
Zhao et. al., "A Novel Sol-Gel Synthesis Route to $NaVPO4F$ as Cathode Material for Hybrid Lithium Ion Batteries," Journal of Power Sources, 2010, vol. 195, pp. 6854-6859.
Ellis et. al. "A Multifunctional 3.5V Iron-based Phosphate Cathode for Rechargeable Batteries," Nature Materials, 2007, vol. 6, pp. 749-753.
Feb. 18, 2016 Office Action issued in U.S. Appl. No. 14/440,104.
Partial Translation of Mar. 4, 2016 Office Action issued in Chinese Application No. 201380030591.0.
Nose et al., "$Na4Co3(PO4)2P2O7$: A Novel Storage Material for Sodium-Ion Batteries," Journal of Power Sources, 234, 2013, pp. 175-179.
Nose et al., "Electrochemical Li+ Insertion Capabilities of $Na4-xCo3(PO4)2P2O7$ and its Application to Novel Hybrid-Ion Batteries," RSC Adv., 2014, 4, p. 9044.
Jun. 21, 2016 Office Action issued in U.S. Appl. No. 14/405,830.
Jun. 9, 2016 Office Action issued in U.S. Appl. No. 14/440,104.
Oct. 13, 2016 Notice of Allowance issued in U.S. Appl. No. 14/405,830.

\* cited by examiner (a) EXAMPLE 4

(b) EXAMPLE 5

(c) EXAMPLE 6

(d) EXAMPLE 7

(e) EXAMPLE 8

F I G . 16
(a) EXAMPLE 9
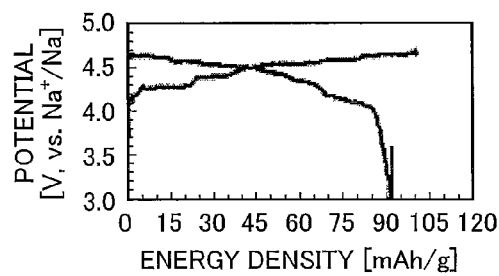
(b) EXAMPLE 10
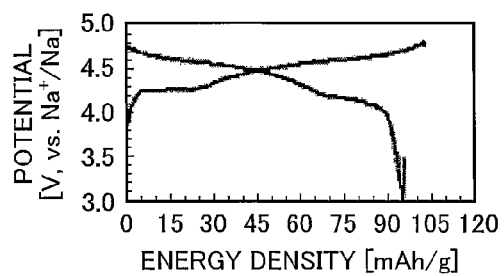
(c) EXAMPLE 11
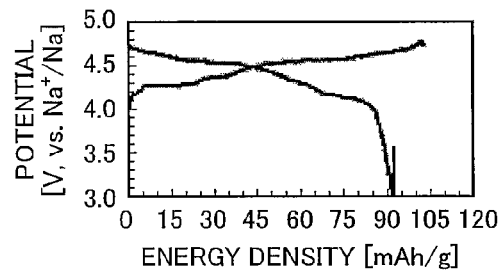
(d) EXAMPLE 12
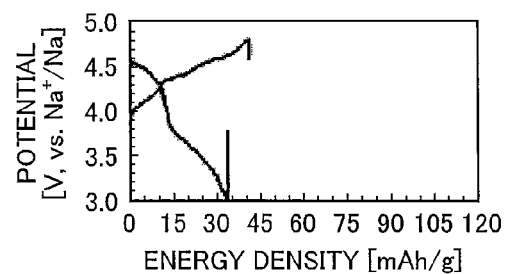

POSITIVE ELECTRODE ACTIVE MATERIAL FOR SODIUM BATTERY, AND METHOD OF PRODUCING THE SAME

TECHNICAL FIELD

The invention relates to a positive electrode active material for a sodium battery, and to a method of producing such an active material.

BACKGROUND ART

In recent years, with the rapid spread of information-related devices such as personal computers, video cameras and mobile phones, the importance in developing improved batteries for use as power supplies in such devices has been more recognized. In the automotive industry as well, advances are being made in the development of high-power and high-capacity batteries for electric cars and hybrid cars. Of the various types of batteries that exist, particular attention is being paid to lithium batteries on account of their high energy density and power.

In a lithium battery, the positive electrode active material is generally a lithium metal complex oxide having a layered structure of, for example, lithium nickelate and lithium cobaltate. The negative electrode active material is typically, for example, a carbon material capable of intercalating and deintercalating lithium ions, lithium metal, or a lithium alloy. The electrolyte interposed between the positive electrode and the negative electrode is generally, for example, an electrolyte solution containing in which lithium salt has been dissolved, or a lithium-containing solid electrolyte.

Although lithium batteries do have, as noted above, an excellent energy density and power, the rising price of lithium associated with increased demand for lithium batteries and the fact that lithium reserves are limited serve as bottlenecks to mass production and the scaling up of production.

Hence, research is being carried out on sodium batteries, which use sodium—natural deposits of which are abundant and which is low in cost—instead of lithium (see, for example, Patent Document 1 and Non-Patent Documents 1 to 4).

For example, Patent Document 1 discloses positive electrode active materials for nonaqueous electrolyte secondary batteries of the formula $Ma_xMb_yP_2O_7$ (where Ma is Na, Li, Ca or Mg, Mb is a transition metal that is stably present at a valence of 4 and above, $0 \leq x \leq 4$, $0.5 \leq y \leq 3$, and $6 \leq z \leq 14$). What was in fact produced and evaluated in the working examples of Patent Document 1 was $MoP_2O_7$.

Patent Document 1: Japanese Patent Application Publication No. 2004-158348

Patent Document 2: Japanese Patent Application Publication No. 2005-183395

Non-Patent Document 1: Abstract #389, 218th ECS Meeting (2010), The Electrochemical Society Non-Patent Document 2: LiBD-5 2011—Electrode materials—Arcachon, France; 12-17 Jun. 2011

Non-Patent Document 3: *Electrochemistry Communications*, 12 (2010), 355-358

Non-Patent Document 4: *Nature Materials DOI*; 10.1038/NMAT2920

Non-Patent Document 5: *Richiumu niji-denchi* (Lithium secondary batteries), written and edited by Zenpachi OGUMI (Ohmsha), p. 77

SUMMARY OF THE INVENTION

However, when the $MoP_2O_7$ produced and evaluated in the working examples of Patent Document 1 are used as the positive electrode active material in sodium batteries, one drawback is that the working potential is low. Also, as mentioned in Non-Patent Documents 1 to 4, positive electrode active materials for sodium batteries currently in common use have a working potential of at most about 3.5 V.

Patent Document 2 describes, as an active material for lithium batteries, $Li_4Ni_3(PO_4)_2(P_2O_7)$ although this is not a positive electrode active material for sodium batteries, and Non-Patent Document 5 describes $LiCoO_2$ at a potential of about 4 V.

Also, because the $MoP_2O_7$ that is in fact produced and evaluated in Patent Document 1 does not contain Na, when it is used as the positive electrode active material in a sodium battery, operation of the sodium battery must begin with the insertion of Na ions (discharging reaction). It is thus necessary for the negative electrode active material used together with such a positive electrode active material to be an active material which already contains Na. However, no Na-containing negative electrode active material that works at a low potential and is capable of securing a sufficient electromotive force has been reported to date, and the development of such an active material for practical use faces substantial obstacles.

This invention has been made in the light of the above circumstances. An object of the invention is to provide a positive electrode active material for sodium batteries which has a high working potential and can be charged and discharged at a high potential, and another object of the invention is to provide a method of producing such an active material.

The positive electrode active material for a sodium battery according to the invention is represented by general formula (1) below:

$$Na_xM_y(AO_4)_z(P_2O_7)_w \qquad \text{general formula (1)}$$

(In formula (1), M is at least one selected from the group consisting of titanium (Ti), vanadium (V), chromium (Cr), manganese (Mn), iron (Fe), cobalt (Co), nickel (Ni), copper (Cu) and zinc (Zn); A is at least one selected from the group consisting of aluminum (Al), silicon (Si), phosphorus (P), sulfur (S), titanium (Ti), vanadium (V) and tungsten (W); x satisfies the condition $4 \geq x \geq 2$; y satisfies the condition $4 \geq y \geq 1$, z satisfies the condition $4 \geq z \geq 0$; w satisfies the condition $1 \geq w \geq 0$; and at least one of z and w is 1 or more.)

The positive electrode active material for a sodium battery according to the invention has a high working potential and achieves high energy densification of the sodium battery.

In above formula (1), it is preferable for M to be divalent prior to charging, the reason being that M acquires a trivalent or more highly oxidized state during charging, making it possible for the battery to function at a high potential.

The positive electrode active material for a sodium battery according to the invention preferably has a crystal structure belonging to the space group Pn2₁a. The reason is that, when the positive electrode active material has a crystal structure belonging to the space group Pn2₁a, all of the Na ions within the crystal structure are arrayed in the direction of the a axis, b axis or c axis, which is very advantageous for the conduction of Na ions.

In a preferred embodiment of the positive electrode active material for a sodium battery according to the invention, M in above formula (1) is at least one selected from the group consisting of Mn, Co and Ni, and a portion thereof may be substituted with at least one element which differs from M and which is selected from the group consisting of Ti, V, Cr, Mn, Fe, Co, Ni, Cu and Zn. A positive electrode active material for a sodium battery according to this embodiment readily assumes a crystal structure belonging to the space group $Pn2_1a$ and has an excellent Na ion conductivity.

In a more preferred embodiment of the positive electrode active material for a sodium battery according to the invention, M in above formula (1) is Ni, and a portion of the Ni may be substituted with at least one selected from the group consisting of Ti, V, Cr, Mn, Fe, Co, Cu and Zn.

In another preferred embodiment of the positive electrode active material for a sodium battery of the invention, A in above formula (1) is at least one selected from the group consisting of Si, P and S, and a portion thereof may be substituted with at least one element which differs from A and which is selected from the group consisting of Al, Si, P, S, Ti, V and W. A positive electrode active material for a sodium battery according to this embodiment readily assumes a crystal structure belonging to the space group $Pn2_1a$ and has an excellent Na ion conductivity.

In a more preferred embodiment of the positive electrode active material for a sodium battery according to the invention, A in formula (1) is P, and a portion of the P may be substituted with at least one selected from the group consisting of Al, Si, S, Ti, V and W.

Examples of the positive electrode active material for a sodium battery according to the invention include compounds represented by general formula $Na_4Ni_3(PO_4)_2(P_2O_7)$, compounds represented by general formula $Na_4Mn_3(PO_4)_2(P_2O_7)$, compounds represented by general formula $Na_4Co_3(PO_4)_2(P_2O_7)$, compounds represented by general formula $Na_4Co_{(3-a)}Mn_a(PO_4)_2(P_2O_7)$ (where "a" satisfies the condition $0.3 \leq a \leq 0.8$) and compounds represented by general formula $Na_4Co_{(3-b-c)}Mn_bNi_c(PO_4)_2(P_2O_7)$ (where "b" satisfies the condition $0.3 \leq b \leq 1.0$, and "c" satisfies the condition $0.3 \leq c \leq 1.0$).

The inventive method of producing the positive electrode active material for a sodium battery includes:

a pre-firing step of firing a starting material mixture containing at least a Na-containing compound, an M-containing compound containing M above, an A-containing compound containing A above and a P-containing compound in an open-air atmosphere at from 150 to 500° C.; and a main firing step of firing the thus-obtained pre-fired material in an open-air atmosphere at from 500 to 800° C. after implementing the pre-firing step.

The inventive method of producing a positive electrode active material for a sodium battery may further include, prior to the pre-firing step, the step of size-reducing the Na-containing compound, the M-containing compound, the A-containing compound and the P-containing compound.

This invention enables a positive electrode active material for sodium batteries which has a high working potential and can be charged and discharged at a high potential to be provided. By using the inventive positive electrode active material for sodium batteries, it is possible to achieve high energy densities in sodium batteries.

BRIEF DESCRIPTION OF THE DRAWINGS

FIG. 16 shows the results of evaluations on the charge-discharge characteristics of positive electrodes fabricated using the positive electrode active materials synthesized in Examples 9 to 12.

MODES FOR CARRYING OUT THE INVENTION

Figure 1:
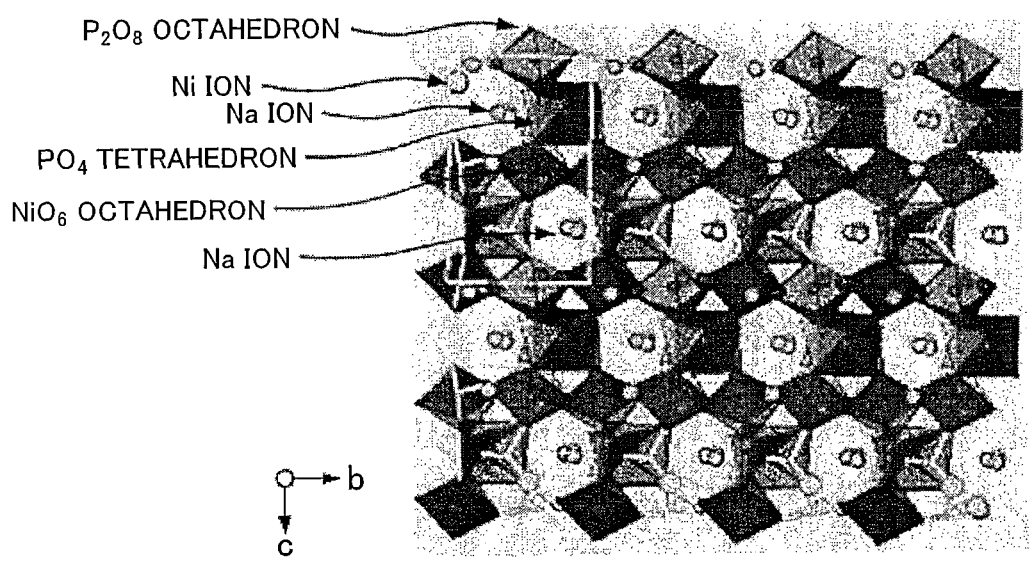
FIG. 1 shows the crystal structure of the space group $Pn2_1a$, as seen from the a-axis direction.

The inventive positive electrode active material for a sodium battery (sometimes referred to below as simply the "positive electrode active material") and the inventive method of producing the same are described in detail below.

[Positive Electrode Active Material for Sodium Battery]

The positive electrode active material for a sodium battery of the invention is characterized by having general formula (1) below.

$$Na_xM_y(AO_4)_z(P_2O_7)_w \qquad \text{general formula (1)}$$

(In formula (1), M is at least one selected from the group consisting of Ti, V, Cr, Mn, Fe, Co, Ni, Cu and Zn; A is at least one selected from the group consisting of Al, Si, P, S, Ti, V and W; x satisfies the condition $4 \geq x \geq 2$; y satisfies the condition $4 \geq y \geq 1$, z satisfies the condition $4 \geq z \geq 0$; w satisfies the condition $1 \geq w \geq 0$; and at least one of z and w is 1 or more.)

As described above, conventional positive electrode active materials for sodium batteries have a working potential of about 3.5 V or less, as a result of which sodium batteries of sufficient energy density have not been achieved.

When the Li in an active material for a lithium battery is replaced with Na, the working potential tends to undergo a large decrease. For example, as mentioned in Non-Patent Document 5 above, LiCoO$_2$ has a potential of about 4 V, whereas, as mentioned in Non-Patent Document 4, the average potential for Na(x)CoO$_2$ is about 2.9 V, which is significantly lower than that for LiCoO$_2$.

Also, because Na ions have a larger ionic radius than Li ions, when the Li in a Li-containing active material is replaced with Na, movement of the Na ions is thought to become difficult.

For reasons such as these, the common view has been that a useful active material for sodium batteries which works at a high potential cannot be obtained by merely replacing the lithium in an active material for lithium batteries with sodium.

However, the inventors have conducted extensive investigations, ultimately discovering that the compound of the formula Na$_4$Ni$_3$(PO$_4$)$_2$(P$_2$O$_7$) can be used as a positive electrode active material for a sodium battery, and moreover works at very high potentials such as 4.6 to 4.9 V. In addition, because decomposition of the electrolyte solution used together with the positive electrode active material can be suppressed at such potentials of 4.6 to 4.9 V, by using the positive electrode active material of the invention, it is possible to obtain a sodium battery which manifests stable battery characteristics over an extended period of time. The inventor has also found that the compound of the formula Na$_4$Mn$_3$(PO$_4$)$_2$(P$_2$O$_7$), the compound of the formula Na$_4$Co$_3$(PO$_4$)$_2$(P$_2$O$_7$), the compound of the formula Na$_4$Co$_{(3-a)}$Mn$_a$(PO$_4$)$_2$(P$_2$O$_7$), and the compound of the formula Na$_4$Co$_{(3-b-c)}$Mn$_b$Ni$_c$(PO$_4$)$_2$(P$_2$O$_7$) are capable of use as positive electrode active materials for sodium batteries and function at high potentials in excess of 4 V.

Moreover, the positive electrode active materials of the invention are capable of functioning at high potentials even at the relatively low temperature of 25° C.

Compounds of above general formula (1) Na$_x$M$_y$(AO$_4$)$_z$(P$_2$O$_7$)$_w$ as with the above compound Na$_4$Ni$_3$(PO$_4$)$_2$(P$_2$O$_7$), are capable of functioning at a high potential as the positive electrode active material of a sodium battery. The reason is thought to be as follows.

In general formula (1), M is an electrochemically active transition metal with a valence of 2 or more, and is either Ni or a metal having an ionic radius close to that of Ni.

In general formula (1), A is P or an element which, like P, readily assumes a tetrahedral structure. Here, "tetrahedral structure" refers to a structure in the form of a tetrahedron having four oxygen atoms at the vertices and containing, in a gap within the tetrahedron, a single A atom that is covalently bonded with the four oxygen atoms.

With regard to the polyanionic portions (AO$_4$) and (P$_2$O$_7$), provided at least one of the subscripts z representing the constitutional ratio of (AO$_4$) and w representing the constitutional ratio of (P$_2$O$_7$) in the positive electrode active material is 1 or more, it is thought that the resulting positive electrode active material functions at a high potential owing to inductive effects on the M-O bonds by ate least one of the portions (AO$_4$) and (P$_2$O$_7$). "Inductive effects" means that, due to the high covalent bondability of the A-O bonds making up (AO$_4$) and the P—O bonds making up (P$_2$O$_7$), the electrons of the M-O bonds are drawn to the A-O bond and P—O bond side, the covalent bondability between M and O decreases, and the energy gap of the hybrid orbital becomes smaller, as a result of which the redox level of M falls, the energy difference with sodium becomes larger, and the redox potential with respect to sodium rises.

The composition of the inventive positive electrode active material is described in detail below.

In the positive electrode active material of the invention, M is at least one metal species selected from the group consisting of Ti, V, Cr, Mn, Fe, Co, Ni, Cu and Zn. Of these, a metal which is divalent in the state prior to charging is preferred. This is because, in cases where M is a metal species that is divalent in the state prior to charging, this metal species assumes a highly oxidized state having a valence of 3 or more during charging, enabling the active material to function at a high potential.

Of the metal pieces above, M is preferably at least one selected from the group consisting of Mn, Co and Ni. This is because Mn, Co and Ni are divalent in the state prior to charging, and because Mn and Co are capable of forming crystal structures similar to that of Ni. In above general formula (1) Na$_x$M$_y$(AO$_4$)$_z$(P$_2$O$_7$)$_w$, M may be Ni, M or Co. In cases where the remainder of the composition (the values of x, y, z and w, and also A) is the same, it has been confirmed that the compound has the same crystal structure.

Some portion of these Mn, Co and Ni may be substituted with at least one element differing from M (which is at least one selected from Mn, Co and Ni) which is selected from the group consisting of Ti, V, Cr, Mn, Fe, Co, Ni, Cu and Zn.

When M in above formula (1) is Ni, a positive electrode active material having a high electron conductivity can be obtained. The reason is thought to be that, in cases where the redox element, i.e., the element that carries out the donation and acceptance of electrons, is Ni, with the extraction of Na ions during charging, in Ni complex oxides having a common olivine-type crystal structure, the Ni ions change from a divalent state to a trivalent state. By contrast, in the positive electrode active material of the invention, the Ni ions change from a divalent state to a larger than trivalent state (e.g., in the case of Na$_4$Ni$_3$(PO$_4$)$_2$(P$_2$O$_7$), a valence of about 3.3), and so a larger number of electrons migrate. Ni may be substituted with at least one species selected from the group consisting of Ti, V, Cr, Mn, Fe, Co, Cu and Zn.

When M in above formula (1) is Mn, compared with when M=Ni, a positive electrode active material having a high crystal structure reversibility and high stability during charging and discharging, and also having a relatively low working potential, can be obtained. Because the working potential is relatively low, decomposition and deterioration of the electrolyte solution can be further suppressed. Hence, when M is Mn, compared with when M=Ni, the reversibility of the crystal structure and the stability are improved and deterioration of the electrolyte solution is suppressed, enabling a high cycle performance to be achieved. Some portion of the Mn may be substituted with at least one selected from the group consisting of Ti, V, Cr, Fe, Co, Ni, Cu and Zn.

When M in above formula (1) is Co, compared with when M=Ni, a positive electrode active material having a high crystal structure reversibility and high stability during charging and discharging, and also having a relatively low working potential, can be obtained. Because the working potential is relatively low, decomposition and deterioration of the electrolyte solution can be further suppressed. Moreover, when M is Co, owing to improved crystal structure reversibility, improved stability and the electrolyte solution deterioration suppressing effects, the positive electrode active material is able to exhibit a large reversible capacity. Hence, when M is Co, compared with when M=Ni, the battery is capable of achieving an excellent cycle performance and an excellent capacity performance.

Some portion of the Co may be substituted with at least one selected from the group consisting of Ti, V, Cr, Mn, Fe, Ni, Cu and Zn.

When M in above formula (1) is Co and a portion of the Co is substituted with Mn, an even better capacity performance can be exhibited than when M is Co alone. The reason is thought to be that, by substituting a portion of the $Co^{2+}$ sites with $Mn^{2+}$, the substituted $Mn^{2+}$ can be charge compensated not only to $Mn^{2+/3+}$, but even to $Mn^{3+/4+}$. Moreover, some portion of the Co and Mn may be substituted with at least one selected from the group consisting of Ti, V, Cr, Mn, Fe, Co, Ni, Cu and Zn.

When M in above formula (1) is Co and a portion of the Co is substituted with Mn and Ni, an even higher working potential can be exhibited than when a portion of the Co has been substituted with Mn alone. The reasons are thought to be that the substituted $Mn^{2+}$ can be charge compensated not only to $Mn^{2+/3+}$, but even to $Mn^{3+/4+}$, and also that some of the Co is substituted with Ni, for which charge compensation ($Ni^{2+} \rightarrow Ni^{3+}$) at a high potential proceeds more readily than for Co. Some portion of the Co, Mn, and Ni may be substituted with at least one selected from the group consisting of Ti, V, Cr, Mn, Fe, Co, Ni, Cu and Zn.

In the positive electrode active material of the invention, A is at least one selected from the group consisting of Al, Si, P, S, Ti, V and W, and is more preferably at least one selected from the group consisting of Si, P and S. The reason is that Si, P and S readily form a tetrahedral structure in particular, and Si and S are capable of forming a crystal structure similar to that of P. Of these, A is most preferably P. Some portion of the Si, P and S may be substituted with at least one element which differs from A (i.e., at least one selected from among Si, P and S) and is selected from the group consisting of Al, Si, P, S, Ti, V and W.

In formula (1), x satisfies the condition $4 \geq x \geq 2$, y satisfies the condition $4 \geq y \geq 1$, z satisfies the condition $4 \geq z \geq 0$, w satisfies the condition $1 \geq w \geq 0$, and at least one of z and w is 1 or more.

In cases where z and w are both 1 or more, because the polyanion portion includes an $AO_4$ tetrahedron and $P_2O_7$ which shares one oxygen with the $AO_4$ tetrahedron, the inductive effect on the M-O bonds is large, which has the desirable effect of enabling a positive electrode active material having a higher potential to be obtained.

In this invention, an especially preferred positive electrode active material is the compound of the formula $Na_4Ni_3(PO_4)_2(P_2O_7)$. Because $Na_4Ni_3(PO_4)_2(P_2O_7)$ includes Ni as a redox element and the polyanion portion includes ($PO_4$) and ($P_2O_7$), along with having a high electron conductivity as noted above, this compound has the ability to work at a high potential owing to a high inductive effect.

Figure 2:
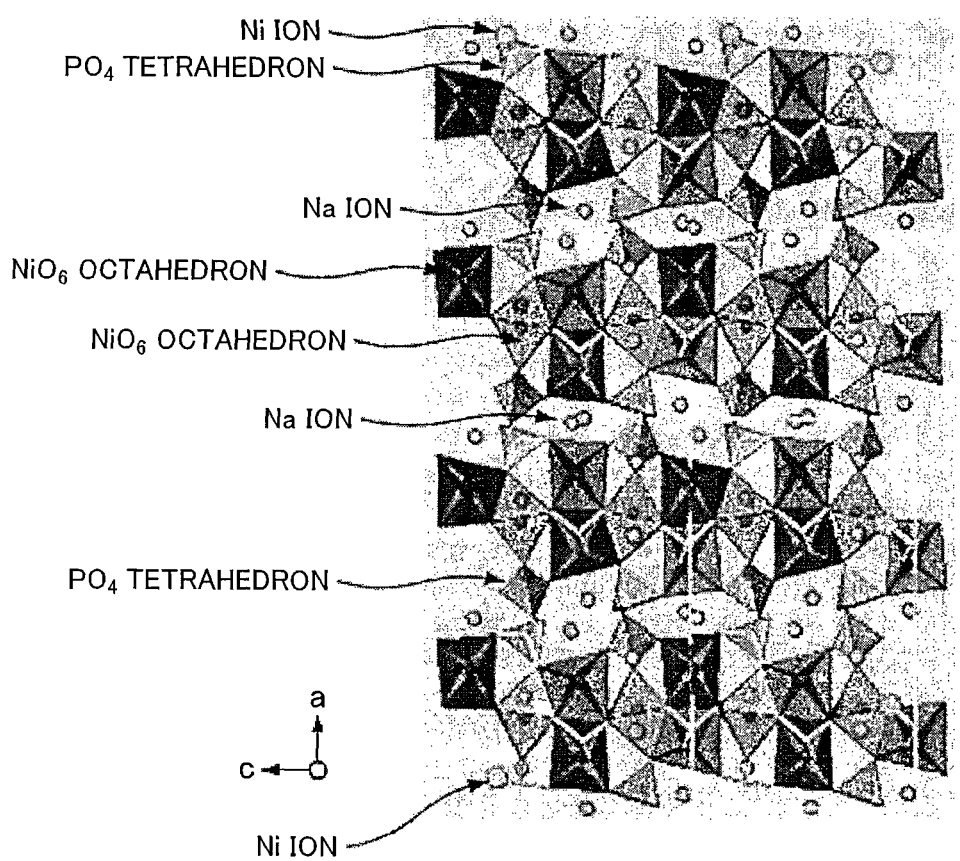
FIG. 2 shows the crystal structure of the space group $Pn2_1a$, as seen from the b-axis direction.
Figure 3:
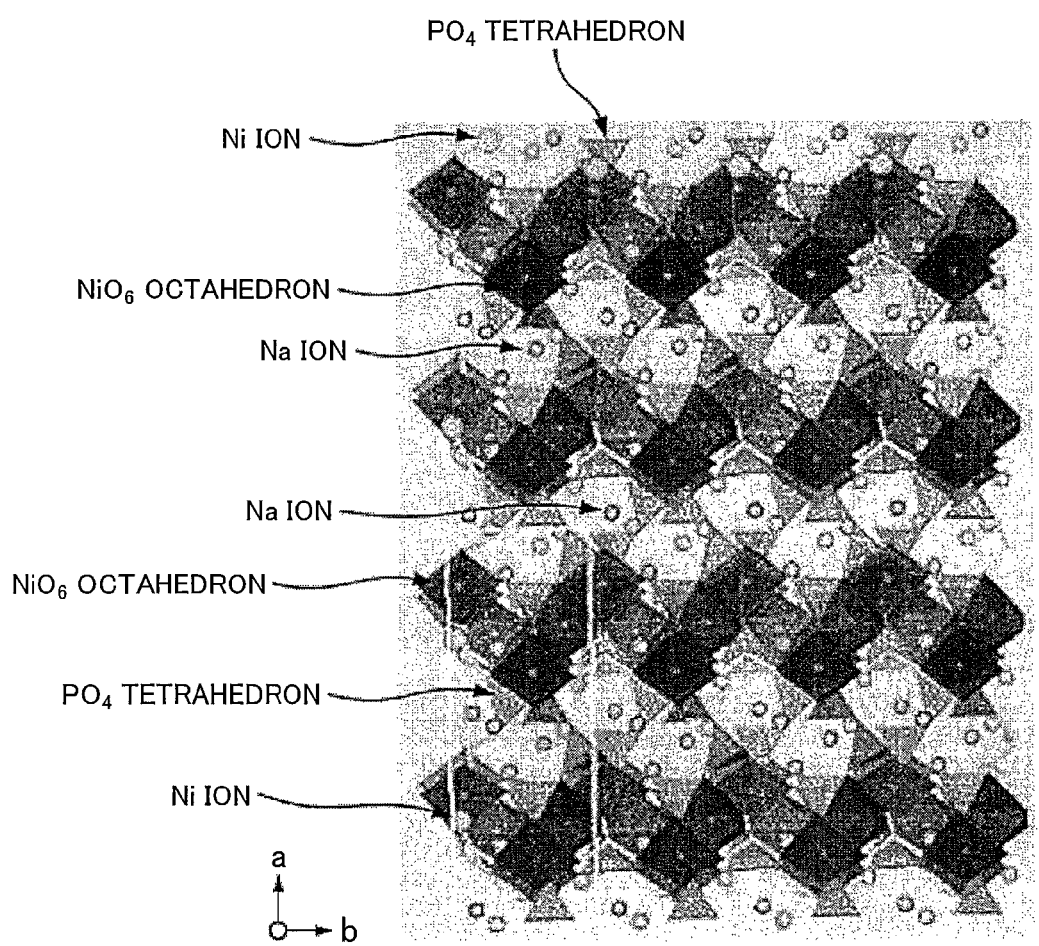
FIG. 3 shows the crystal structure of the space group $Pn2_1a$, as seen from the c-axis direction.

In addition, $Na_4Ni_3(PO_4)_2(P_2O_7)$ has a crystal structure belonging to the space group $Pn2_1a$. FIGS. 1 to 3 show the crystal structure ($Na_4Ni_3(PO_4)_2(P_2O_7)$) belonging to the space group $Pn2_1a$ in a view from the a-axis direction (FIG. 1), a view from the b-axis direction (FIG. 2), and a view from the c-axis direction (FIG. 3). Using $Na_4Ni_3(PO_4)_2(P_2O_7)$ for the purpose of illustration, FIGS. 1 to 3 show a crystal structure belonging to the space group $Pn2_1a$. However, in FIGS. 1 to 3, by substituting Ni with another metal species represented by M above (e.g., Co or Mn), the crystal structure of another positive electrode active material having a crystal structure belonging to the space group $Pn2_1a$ is exhibited.

As is apparent from FIGS. 1 to 3, in the crystal structure belonging to the space group $Pn2_1a$, all of the Na ions in the crystal structure are arrayed in the direction of the a axis, b axis or c axis, resulting in a very high Na ion mobility. That is, the crystal structure belonging to the space group $Pn2_1a$ is highly advantageous for conducting Na ions, as a result of which the insertion and extraction of Na ions proceeds smoothly.

For reasons such as these, it is preferable for the positive electrode active material of the invention to have a crystal structure belonging to the space group $Pn2_1a$.

In this invention, additional examples of especially preferred positive electrode active materials include compounds of the general formula $Na_4Mn_3(PO_4)_2(P_2O_7)$, compounds of the general formula $Na_4Co_3(PO_4)_2(P_2O_7)$, compounds of the general formula $Na_4Co_{(3-a)}Mn_a(PO_4)_2(P_2O_7)$ and compounds of the general formula $Na_4Co_{(3-b-c)}Mn_bNi_c(PO_4)_2(P_2O_7)$. These compounds all have crystal structures belonging to the space group $Pn2_1a$ shown in FIGS. 1 to 3.

As already mentioned, the compound $Na_4Mn_3(PO_4)_2(P_2O_7)$ containing Mn as the redox element (M), by improving the crystal structure reversibility, improving stability and suppressing deterioration of the electrolyte solution, is capable of manifesting a high cycle performance.

As already mentioned, compounds of the general formula $Na_4Co_3(PO_4)_2(P_2O_7)$ containing Co as the redox element (M), by improving the crystal structure reversibility, improving stability, suppressing deterioration of the electrolyte solution and increasing the reversible capacity, are capable of manifesting an excellent cycle performance and an excellent capacity performance.

Also, as already mentioned above, compounds of the formula $Na_4CO_{(3-a)}Mn_a(PO_4)_2(P_2O_7)$ which include Co as the redox element (M) and in which some portion of the Co is substituted with Mn, by charge compensation due to the Mn, are capable of manifesting an even better capacity performance than $Na_4Co_3(PO_4)_2(P_2O_7)$.

In compounds of general formula $Na_4CO_{(3-a)}Mn_a(PO_4)_2(P_2O_7)$, the subscript 'a' representing the amount of Mn substitution should be a number less than 3, is preferably within the range of $0.01 \leq a \leq 0.8$, and is more preferably in the range of $0.3 \leq a \leq 0.8$, with the subscript 'a' most preferably being 0.6.

In addition, as already mentioned above, in compounds of general formula $Na_4CO_{(3-b-c)}Mn_bNi_c(PO_4)_2(P_2O_7)$ which include Co as the redox element (M) and in which some portion of the Co is substituted with Mn and Ni, the charge compensating effect due to the Mn and, additionally, the charge compensating effect in the high potential region due to the Ni enable such compounds to exhibit a high working potential compared with $Na_4CO_{(3-a)}Mn_a(PO_4)_2(P_2O_7)$.

In compounds of general formula $Na_4CO_{(3-b-c)}Mn_bNi_c(PO_4)_2(P_2O_7)$, the subscript 'b' representing the amount of Mn substitution and the subscript 'c' representing the amount of Ni substitution should be such that the sum (b+c) is a number less than 3, and are preferably within the ranges $0.01 \leq b \leq 1.0$ and $0.01 \leq c \leq 1.0$, and more preferably within the ranges $0.3 \leq b \leq 1.0$ and $0.3 \leq c \leq 1.0$.

[Method of Producing Positive Electrode Active Material]

The method of producing the positive electrode active material of the invention is not particularly limited, although an example of a preferred method is one in which the positive electrode active material of the invention is produced as described below.

The inventive method of producing a positive electrode active material for a sodium battery is characterized by including, in order:

a pre-firing step that entails firing a starting material mixture containing at least a Na-containing compound, a compound containing the M, a compound containing the A and a P-containing compound in an open-air atmosphere at from 150 to 500° C.; and a main firing step that entails firing the pre-fired material in an open-air atmosphere at from 500 to 800° C.

As mentioned above, a single-phase positive electrode active material can be synthesized by first pre-firing a starting material mixture at a temperature of from 150 to 500° C. which is lower than in the main firing step, then carrying out a main firing step at from 500 to 800° C. so that the reaction proceeds uniformly.

Each of the steps in the inventive method of producing a positive electrode active material is described in turn below.

(Pre-Firing Step)

In the pre-firing step, a starting material mixture containing at least a Na-containing compound, an M-containing compound, an A-containing compound and a P-containing compound is fired in an open-air atmosphere at from 150 to 500° C.

The Na-containing compound, the M-containing compound, the A-containing compound and the P-containing compound are the starting materials for the positive electrode active material $Na_xM_y(AO_4)_z(P_2O_7)_w$, and serve as, respectively, the Na source, the M source, the A source and the P source.

The Na-containing compound, the M-containing compound, the A-containing compound and the P-containing compound may be suitably selected without particular limitation. These respective compounds may each be of one type used alone, or of two or more types used in combination. Alternatively, a single compound may include two or more from among Na, M, A and P. In cases where M and A include common atoms, the M-containing compound and the A-containing compound may be the same compound. In cases where A is P, the A-containing compound and the P-containing compound may be the same compound.

Illustrative examples of Na-containing compounds serving as the Na source include $Na_2CO_3$, $Na_2O$, $Na_2O_2$, $Na_3PO_4$, $Na_4P_2O_7$ and $CH_3COONa$.

Illustrative examples of M-containing compounds serving as the M source include Ti-containing compounds such as $TiO_2$ and $Ti_2O_3$, V-containing compounds such as $V_2O_3$, $V_2O_5$ and $NH_4VO_3$, Cr-containing compounds such as $Cr_2O_3$ and $Cr(NO_3)_3$, Mn-containing compounds such as $MnCO_3$ and $(CH_3COO)_2Mn$, Fe-containing compounds such as FeO, $Fe_2O_3$ and $Fe(NO_3)_3$, Co-containing compounds such as $CoCO_3$, $(CH_3COO)_2Co$, CoO and $Co_2O_3$, Ni-containing compounds such as $(CH_3COO)_2Ni$, $NiCO_3$ and NiO, Cu-containing compounds such as $(CH_3COO)_2Cu$ and CuO, and Zn-containing compounds such as $(CH_3COO)_2Zn$ and ZnO.

Illustrative examples of A-containing compounds serving as the A source include Al-containing compounds such as $Al(NO_3)_3$, $Al_2O_3$ and $Al(OH)_3$, Si-containing compounds such as $SiO_2$ and SiO, P-containing compounds such as $NH_4H_2PO_4$, $(NH_4)_2HPO_4$, $H_3PO_4$, $Na_2P_2O_7$ and $Na_3PO_4$, S-containing compounds such as $(NH_4)_2SO_4$, $Na_2SO_4$ and $H_2SO_4$, Ti-containing compounds such as $TiO_2$ and $Ti_2O_3$, V-containing compounds such as $V_2O_3$, $V_2O$ and $NH_4VO_3$, and W-containing compounds such as $WO_3$ and $Na_2WO_4$.

Illustrative examples of P-containing compounds serving as the P source include $NH_4H_2PO_4$, $(NH_4)_2HPO_4$, $H_3PO_4$, $Na_4P_2O_7$ and $Na_3PO_4$.

In the starting material mixture, the mixing proportions of the above Na-containing compound, M-containing compound, A-containing compound and P-containing compound may be suitably set according to the x, y, z and w subscripts in the $Na_xM_y(AO_4)_z(P_2O_7)_w$ compound that is synthesized. Typically, the respective compounds may be mixed so that the proportions (molar ratio) of Na, M, A and P in the starting material mixture satisfy the condition Na:M:A:P=x:y:z:2w.

No particular limitation is imposed on the method of preparing the starting material mixture. For example, use may be made of any suitable mixing method or stirring method.

Although the particle sizes of the respective compounds in the starting material mixture are not particularly limited, because it is desirable for the surface area of contact between the particles to be large in order to have the reaction proceed uniformly, it is preferable to subject each of the compounds to size reduction prior to pre-firing. That is, prior to pre-firing, it is preferable to provide a size-reducing step which reduces the particle sizes of the Na-containing compound, the M-containing compound, the A-containing compound and the P-containing compound within the starting material mixture. In the size-reducing step, size reduction of the compounds may be carried out on a plurality of compounds at the same time, or may be carried out individually on each compound. Moreover, no particular limitation is imposed on the size-reducing method in the size reduction step. Use may be made of any size-reducing method; use may even be made of a method which combines mixture and stirring of the starting material mixture with size reduction. For example, a ball mill, bead mill or the like is capable of mixing and stirring the starting material mixture while also subjecting the mixture to size reduction.

The temperature in the pre-firing step is lower than the temperature in the main firing step, and should be in the range of 150 to 500° C., preferably 180 to 450° C., and more preferably 250 to 350° C. The pre-firing time is not particularly limited and may be suitably set to, for example, from about 1 to about 5 hours.

The open-air atmosphere serving as the atmosphere in the pre-firing step refers herein to an oxygen-containing gas atmosphere.

(Main Firing Step)

In the main firing step, the pre-fired material obtained in the pre-firing step is fired in an open-air atmosphere at from 500 to 800° C.

The firing temperature in the main firing step is preferably from 550 to 750° C. The firing time in this step is not particularly limited and may be suitably set to, for example, from about 1 to about 30 hours.

The open-air atmosphere serving as the atmosphere in the main firing step is similar to the open-air atmosphere in the pre-firing step.

(Other Production Methods)

The method of producing the inventive positive electrode active material is not limited to the foregoing method. For example, production is also possible by a method in which, first, a Na-containing compounds serving as the Na source, an M-containing compound serving as the M source, an A-containing compound serving as the A source and a P-containing compound serving as the P source are dissolved and heated, together with a gelling agent, in an acidic solution so as to prepare a gel, following which the resulting gel is fired in an open-air atmosphere.

In this method, the Na-containing compound, the M-containing compound, the A-containing compound and the P-containing compound may be suitably selected, so long as they are soluble in an acidic solution. These respective compounds may each be of one type used alone, or of two or more types used in combination. Alternatively, a single compound may include two or more from among Na, M, A and P. In cases where M and A include common atoms, the M-containing compound and the A-containing compound may be the same compound. In cases where A is P, the A-containing compound and the P-containing compound may be the same compound.

Illustrative examples of Na-containing compounds include $Na_4P_2O_7$, $CH_3COONa$, $Na_2CO_3$, $Na_2O$ and $Na_2O_2$.

Illustrative examples of M-containing compounds include Ti-containing compounds such as $Ti(NO_3)_4$, $TiO_2$ and $Ti_2O_3$, V-containing compounds such as $V_2O_3$ and $V_2O_5$, Cr-containing compounds such as $Cr(NO_3)_3$, Mn-containing compounds such as $(CH_3COO)_2Mn$ and $MnCO_3$, Fe-containing compounds such as $Fe(NO_3)_3$, $FeC_2O_4$ and $(CH_3COO)_3Fe$, Co-containing compounds such as $(CH_3COO)_2Co$, $CoCO_3$, $Co_2O_3$ and CoO, Ni-containing compounds such as $(CH_3COO)_2Ni$, NiO and $NiCO_3$, Cu-containing compounds such as $(CH_3COO)_2Cu$, and Zn-containing compounds such as $(CH_3COO)_2Zn$.

Illustrative examples of A-containing compounds include Al-containing compounds such as $Al(NO_3)_3$, Si-containing compounds such as $Si(OCH_2CH_3)_4$, P-containing compounds such as $NH_4H_2PO_4$, $(NH_4)_2HPO_4$ and $H_3PO_4$, S-containing compounds such as $H_2SO_4$ and $Na_2SO_4$, Ti-containing compounds such as $Ti(NO_3)_4$, $TiO_2$ and $Ti_2O_3$, V-containing compounds such as $V_2O_3$ and $V_2O_5$, and W-containing compounds such as $WO_3$ and $Na_2WO_4$.

Illustrative examples of P-containing compounds include $NH_4H_2PO_4$, $(NH_4)_2HPO_4$ and $H_3PO_4$.

The mixing proportions of the above Na-containing compound, the M-containing compound, the A-containing compound and the P-containing compound may be suitably set according to the x, y, z and w subscripts in the $Na_xM_y(AO_4)_z(P_2O_7)_w$ compound that is synthesized. Typically, the respective compounds may be mixed so that the proportions (molar ratio) of Na, M, A and P in the starting material mixture satisfy the condition Na:M:A:P=x:y:z:2w.

The gelling agent may be, for example, glycolic acid. The acidic solvent may be, for example, an aqueous nitric acid solution.

The heating temperature during gel preparation should be such as to cause each of the various above compounds to dissolve in the acidic solution and enable preparation of a gel, and may be set to, for example, from 60 to 120° C.

The gel firing temperature may be set to from 500 to 800° C., and preferably from 550 to 750° C. The open-air atmosphere during gel firing is similar to the open-air atmosphere in the above pre-firing step.

[Sodium Battery]

The positive electrode active material provided by this invention can be advantageously used as a positive electrode active material in a sodium battery. The sodium battery may be either a primary battery or a secondary battery. Using a sodium secondary battery by way of illustration, a description is given below of a sodium battery which uses the positive electrode active material provided by this invention.

Figure 4:
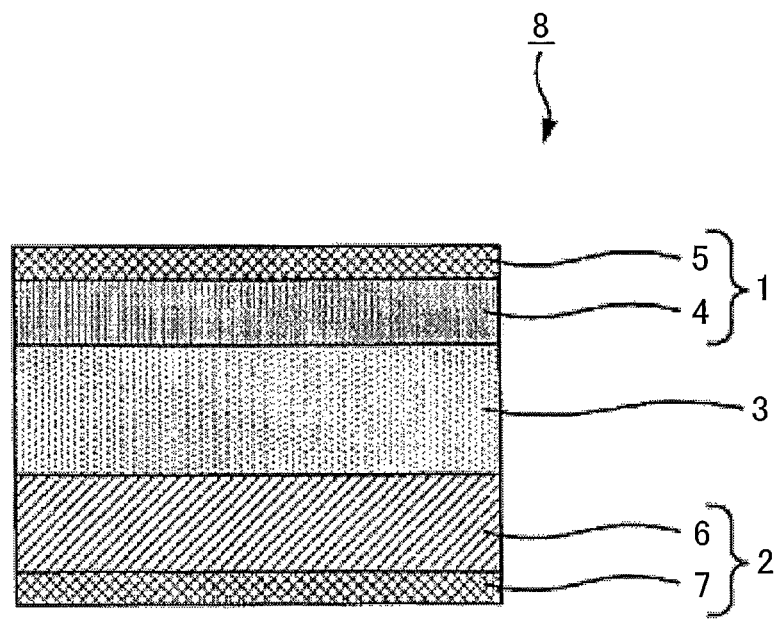
FIG. 4 is a schematic cross-sectional view showing an embodiment of a sodium battery.

FIG. 4 is a schematic cross-sectional diagram showing an embodiment of a sodium secondary battery. As shown in FIG. 4, the sodium secondary battery 8 generally has a structure in which an electrolyte layer 3 is disposed between a negative electrode 1 and a positive electrode 2. The negative electrode 1 has a negative electrode active material layer 4 containing a negative electrode active material, and a negative electrode current collector 5 which carries out charge collection for the negative electrode active material layer 4. The positive electrode 2 has a positive electrode active material layer 6 containing a positive electrode active material, and a positive electrode current collector 7 which carries out charge collection for the positive electrode active material layer 6.

In the following paragraphs, each battery structure is explained.

The negative electrode contains a negative electrode active material capable of the insertion and extraction of sodium ions. The negative electrode generally has a negative electrode active material layer which includes at least a negative electrode active material. Where necessary, it may also have a negative electrode current collector which carries out charge collection for the negative electrode active material layer.

Illustrative examples of the negative electrode active material include hard carbon, Na metal and tin.

The negative electrode active material layer may contain only a negative electrode active material or may, in addition to the negative electrode active material, contain also a binder, a conductive material, an electrolyte and the like. For example, in cases where the negative electrode active material is in the form of a sheet or foil, it may be rendered into a negative electrode layer which contains only the negative electrode active material. On the other hand, in cases where the negative electrode active material is in the form of a powder, it may be rendered into a negative electrode layer which includes a binder in addition to the negative electrode active material.

Illustrative examples of the binder include polyvinylidene fluoride (PVdF), polytetrafluoroethylene (PTFE) and styrene-butadiene rubber (SBR). Illustrative examples of the conductive material include carbon materials such as carbon black, activated carbon, carbon fibers (e.g., carbon nanotubes, carbon nanofibers), and graphite.

The positive electrode contains a positive electrode active material capable of the insertion and extraction of sodium ions. The positive electrode generally has a positive electrode active material layer which includes at least a positive electrode active material. Where necessary, it may also have a positive electrode current collector which carries out charge collection for the positive electrode active material layer.

The positive electrode active material used may be the above-described positive electrode active material of the invention or may be a positive electrode active material produced by the production method of the invention.

As with the negative electrode active material layer, the positive electrode active material layer may contain only a positive electrode active material or may, in addition to the positive electrode active material, contain also a conductive material, a binder, an electrolyte, an electrode catalyst and the like. Because materials similar to those in the negative electrode active material may be used as the conductive material and binder in the positive electrode active material, descriptions of these are omitted below.

In the case of both the negative electrode active material layer and the positive electrode active material layer, the electrode active material layer may be formed by using any suitable coating method, such as dip coating, spray coating, roll coating, doctor blade coating, gravure coating or screen coating, to coat, dry, and optionally roll, slurries containing the respective materials.

The positive electrode current collector and the negative electrode current collector are not subject to any particular limitations with regard to material, structure or shape, provided they are materials which have the desired electron conductivity and which do not give rise to alloying reactions with sodium ion in the environment within the battery.

Illustrative examples of the material making up the positive electrode current collector include metal materials such as stainless steel, nickel, aluminum, iron, titanium and copper, carbon materials such as carbon fibers and carbon paper, and ceramic materials having a high electron conductivity, such as titanium nitride. It is possible for the battery case to serve also as the positive electrode current collector.

Illustrative examples of the material making up the negative electrode current collector include copper, stainless steel, nickel and aluminum. It is possible for the battery case to serve also as the negative electrode current collector.

The positive electrode current collector and the negative electrode current collector may each be in the form of, for example, a sheet, foil or mesh. Of these, a mesh is preferred.

The electrolyte layer includes at least an electrolyte which enables the conduction of sodium ions between the positive electrode and the negative electrode.

The electrolyte should be one having sodium ion conductivity and is exemplified by electrolyte solutions, gel-like electrolytes obtained by the gelation of an electrolyte solution with a polymer or the like, and solid electrolytes.

Examples of electrolyte solutions having sodium ion conductivity include electrolyte solutions obtained by dissolving a sodium salt in an aqueous solvent or a nonaqueous solvent.

Illustrative examples of non-aqueous solvent include, but are not particularly limited to, cyclic carbonates such as propylene carbonate (PC), ethylene carbonate (EC) and fluoroethylene carbonate (FEC), cyclic esters such as γ-butyrolactone (GBL), and acyclic carbonates such as dimethyl carbonate (DMC), diethyl carbonate (DEC) and ethyl methyl carbonate (EMC). These non-aqueous solvents may be used singly or two or more may be used in combination. Alternatively, a nitrile compound having a CN group bonded to the end of an acyclic saturated hydrocarbon compound may be used in admixture with a non-aqueous solvent. By adding a nitrile compound to a non-aqueous solvent-type electrolyte solution, there can be obtained a stable non-aqueous solvent-based electrolyte solution which is stable and does not decompose even in a high potential region such as that where the positive electrode active material for sodium batteries of the invention functions.

Illustrative examples of the sodium salt include, but are not particularly limited to, $NaPF_6$, $NaBF_4$, $NaClO_4$, $NaCF_3SO_3$, $(CF_3SO_2)_2NNa$, $NaN(FSO_2)$ and $NaC(CF_3SO_2)_3$. These sodium salts may be used singly, or two or more may be used in combination. $NaPF_6$, which is stable also at high potentials, is especially preferred.

No particular limitation is imposed on the concentration of the sodium salt in the non-aqueous electrolyte solution.

The non-aqueous electrolyte solution may also be used following gelation by the addition of a polymer. The method of gelating the non-aqueous electrolyte solution is exemplified by a method that involves adding a polymer such as polyethylene oxide (PEO), polyacrylonitrile (PAN), PVdF or polymethyl methacrylate (PMMA) to a non-aqueous electrolyte solution.

In cases where an electrolyte solution is used as the electrolyte, insulation between the positive electrode and the negative electrode can be achieved by disposing an insulating porous body as a separator between the positive electrode and the negative electrode, and impregnating the separator with the electrolyte solution. The separator is exemplified by porous membranes such as polyethylene porous membranes and polypropylene porous membranes; and nonwoven fabrics such as resin nonwoven fabrics and glass fiber nonwoven fabrics.

The battery case used to house the negative electrode, the electrolyte layer and the positive electrode may be one having a common shape, such as a coin-like, flat plate-like, tubular or laminate-type battery case.

In batteries having a construction in which laminates of a positive electrode, an electrolyte layer and a negative electrode disposed in this order are repeatedly stacked in multiple layers, from the standpoint of safety, separators composed of an insulating material can be provided between the adjoining positive and negative electrodes. Illustrative examples of such separators include porous membranes such as polyethylene porous membranes and polypropylene porous membranes; and nonwoven fabrics such as resin nonwoven fabrics and glass fiber nonwoven fabrics.

In addition, terminals serving as connectors to the exterior can be provided on the current collectors for the respective electrodes.

Example 1

(Synthesis of Positive Electrode Active Material for Sodium Battery)

$Na_2CO_3$ (Na-containing compound), $(CH_3COO)_2Ni$ (Ni-containing compound) and $NH_4H_2PO_4$ (P-containing compound) were mixed in a molar ratio of Na:Ni:P=4:3:4. The mixture was size-reduced using a ball mill, following which pre-firing was carried out in an open-air atmosphere at 300° C., and main firing was carried out for 15 hours at 700° C.

Figure 5:
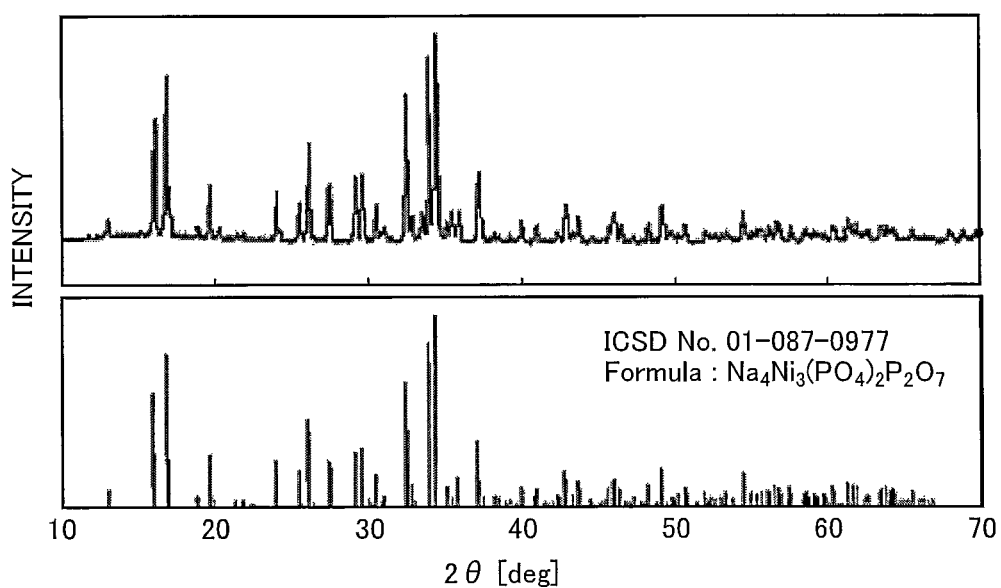
FIG. 5 shows an XRD pattern for the positive electrode active material synthesized in Example 1.

The crystal structure of the synthesized material obtained in the main firing step was analyzed with an x-ray diffractometer (XRD). The results are shown in FIG. 5. The top half of FIG. 5 shows the XRD pattern for the synthesized material, and the bottom half shows the XRD pattern for $Na_4Ni_3(PO_4)_2P_2O_7$ in the ICSD database (ICSD No. 01-087-0977). It was possible to confirm from FIG. 5 that the synthesized material obtained is $Na_4Ni_3(PO_4)_2P_2O_7$. In addition, this synthesized material ($Na_4Ni_3(PO_4)_2P_2O_7$) was continued to have a crystal structure belonging to the space group $Pn2_1a$.

(Evaluation of Positive Electrode Active Material for Sodium Battery)

<Fabrication of Positive Electrode>

A slurry was prepared by mixing the $Na_4Ni_3(PO_4)_2P_2O_7$ (positive electrode active material) obtained in Example 1, carbon (conductive additive) and PVdF (binder) in the weight ratio 75:20:5, then dispersing the mixture in N-methyl-2-pyrrolidone (dispersant).

This slurry was coated onto aluminum foil (current collector), dried and rolled, thereby producing a positive electrode made up of, as successive layers, the current collector and the positive electrode active material layer.

<Fabrication of Test Cell>

First, a counterelectrode was obtained by die-punching a foil of sodium metal.

In a separate procedure, a sodium salt ($NaPF_6$) was added to a mixed solvent obtained by mixing together EC and DMC in a volumetric ratio of 1:1, thereby giving a non-aqueous electrolyte solution having a sodium salt concentration of 1.0 $mol/dm^3$.

The positive electrode fabricated as described above, a porous membrane (separator) made up of a polypropylene porous membrane, a polyethylene porous membrane and a polypropylene porous membrane arranged as successive layers in this order, and a counterelectrode were stacked together in this order. The positive electrode was arranged within the stack so that the positive electrode active material layer lies on the separator side thereof.

The above-described non-aqueous solvent electrolyte solution was impregnated into the separator of the above stack, thereby producing a coin-type test cell.

<Method of Evaluation>

Cyclic voltammetry (CV) was carried out under the following conditions using the above test cell. The results are shown in FIG. 6.

Potential range: Open circuit voltage (OCV) to 4.9 V
Scan rate: 0.2 mV/s
Temperature: 25° C.

Figure 6:
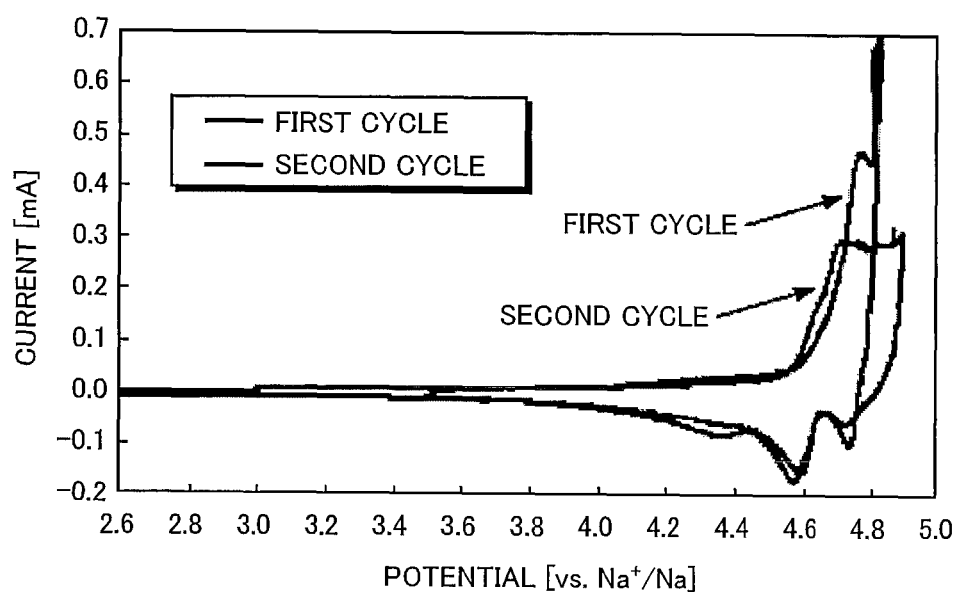
FIG. 6 shows the results of CV measurements, with Na metal serving as the counterelectrode, for a positive electrode fabricated using the positive electrode active material synthesized in Example 1.

As shown in FIG. 6, peaks for the oxidation reaction that corresponds to charging and the reducing reaction that corresponds to discharging were confirmed in the ultrahigh potential region of 4.6 to 4.9 V, both in the first cycle and the second cycle. It was thus confirmed that the synthesized material obtained in Example 1 can be used as the positive electrode active material for a sodium secondary battery, and moreover that it functions at a high potential. In addition, an ability to function at a high potential as described above was exhibited at the low temperature of 25° C.

Example 2

(Synthesis of Positive Electrode Active Material for Sodium Battery)

$Na_4P_2O_7$ (Na- and P-containing compound), $(CH_3COO)_2Mn$ (Mn-containing compound) and $NH_4H_2PO_4$ (P-containing compound) were added, together with glycolic acid (gelating agent), to an acidic solution (aqueous nitric acid solution) in a molar ratio of Na:Mn:P=4:3:4 and dissolved, and the solution was stirred at 80° C. The resulting gel was fired in an open-air atmosphere at 700° C. for 15 hours.

Figure 7:
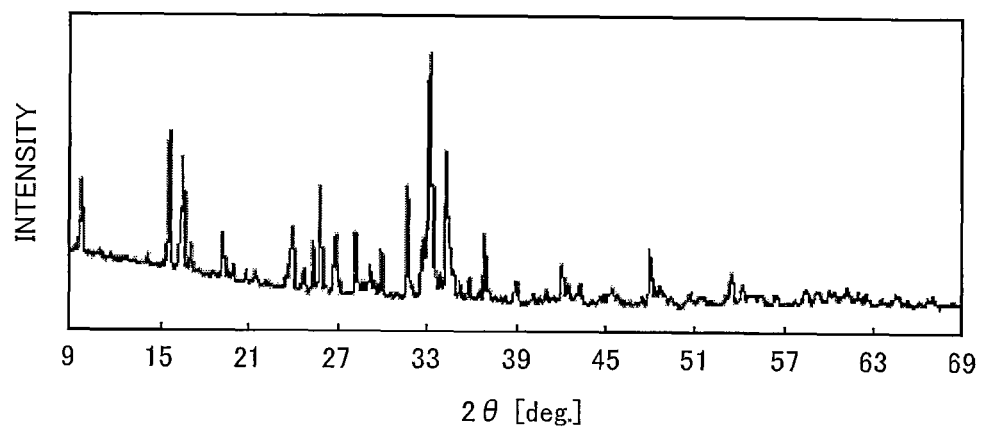
FIG. 7 shows the XRD pattern for the positive electrode active material synthesized in Example 2.

The crystal structure of the synthesized material obtained by firing was analyzed with an XRD. The results are shown in FIG. 7. From FIG. 7, the resulting synthesized material was confirmed to be $Na_4Mn_3(PO_4)_2P_2O_7$. The resulting synthesized material ($Na_4Mn_3(PO_4)_2P_2O_7$) was confirmed to have a crystal structure belonging to the space group $Pn2_1a$ shown in FIGS. 1 to 3.

(Evaluation of Positive Electrode Active Material for Sodium Battery)

<Fabrication of Positive Electrode>

A slurry was prepared by mixing the $Na_4Mn_3(PO_4)_2P_2O_7$ (positive electrode active material) obtained in Example 2, carbon (conductive additive) and PVdF (binder) in the weight ratio 75:20:5, then dispersing the mixture in N-methyl-2-pyrrolidone (dispersant).

This slurry was coated onto aluminum foil (current collector), dried and rolled, thereby producing a positive electrode made up of, as successive layers, the current collector and the positive electrode active material layer.

<Fabrication of Test Cell>

Aside from using DEC instead of DMC, a coin-type test cell was fabricated in the same way as in Example 1.

<Method of Evaluation>

Ten charge-discharge cycles were carried out under the following conditions on the above-described test cell, and the charge-discharge characteristics were evaluated. The relationship between the energy density and the potential in the first cycle and the tenth cycle is shown in FIG. 8.

Potential range: 2.5 V to 4.1 V
Current density: 8.5 mA/g
Temperature: 25° C.

Figure 8:
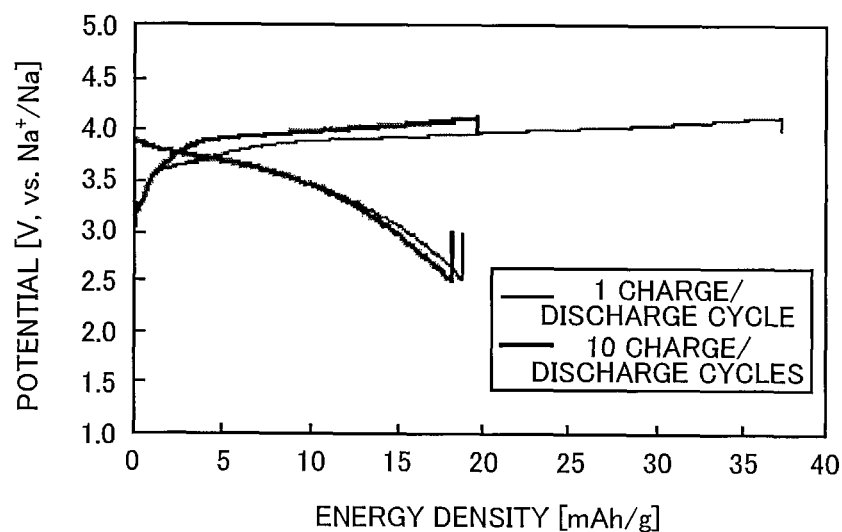
FIG. 8 shows the charge-discharge characteristics (energy density versus potential) for a positive electrode fabricated using the positive electrode active material synthesized in Example 2.

As shown in FIG. 8, even after ten cycles, charging and discharging is possible in the same potential region as in the first cycle. Moreover, it was confirmed that the discharge energy density too can be retained (capacity retention, 96%; reversible capacity, 18 mAh/g). That is, it was found that the positive electrode active material of Example 2 can charge and discharge in a potential region in which the electrolyte solution is stable, and that the cycle performance is excellent.

Example 3

(Synthesis of Positive Electrode Active Material for Sodium Battery)

$Na_4P_2O_7$ (Na- and P-containing compound), $(CH_3COO)_2Co$ (Co-containing compound) and $NH_4H_2PO_4$ (P-containing compound) were added, together with glycolic acid (gelating agent), to an acidic solution (aqueous nitric acid solution) in a molar ratio of Na:Co:P=4:3:4 and dissolved, and the solution was stirred at 80° C. The resulting gel was fired in an open-air atmosphere at 700° C. for 15 hours.

Figure 9:
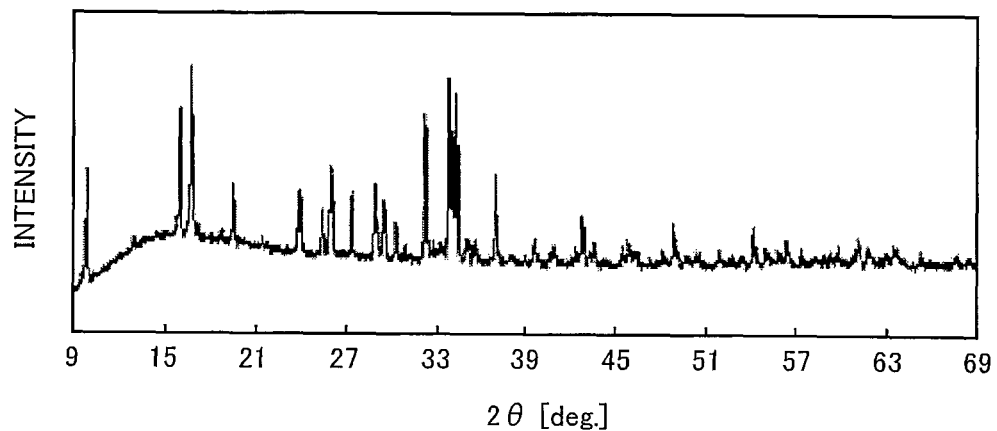
FIG. 9 is an XRD pattern for the positive electrode active material synthesized in Example 3.

The crystal structure of the synthesized material obtained by firing was analyzed with an XRD. The results are shown in FIG. 9. From FIG. 9, the resulting synthesized material was confirmed to be $Na_4Co_3(PO_4)_2P_2O_7$. This synthesized material ($Na_4Co_3(PO_4)_2P_2O_7$) was confirmed to have a crystal structure belonging to the space group $Pn2_1a$ shown in FIGS. 1 to 3.

(Evaluation of Positive Electrode Active Material for Sodium Battery)

<Fabrication of Positive Electrode>

A slurry was prepared by mixing the $Na_4Co_3(PO_4)_2P_2O_7$ (positive electrode active material) obtained in Example 3, carbon (conductive additive) and PVdF (binder) in the weight ratio 75:20:5, then dispersing the mixture in N-methyl-2-pyrrolidone (dispersant).

This slurry was coated onto aluminum foil (current collector), dried and rolled, thereby producing a positive electrode made up of, as successive layers, the current collector and the positive electrode active material layer.

<Fabrication of Test Cell>

A coin-type test cell was fabricated in the same way as in Example 2.

<Method of Evaluation>

Figure 10:
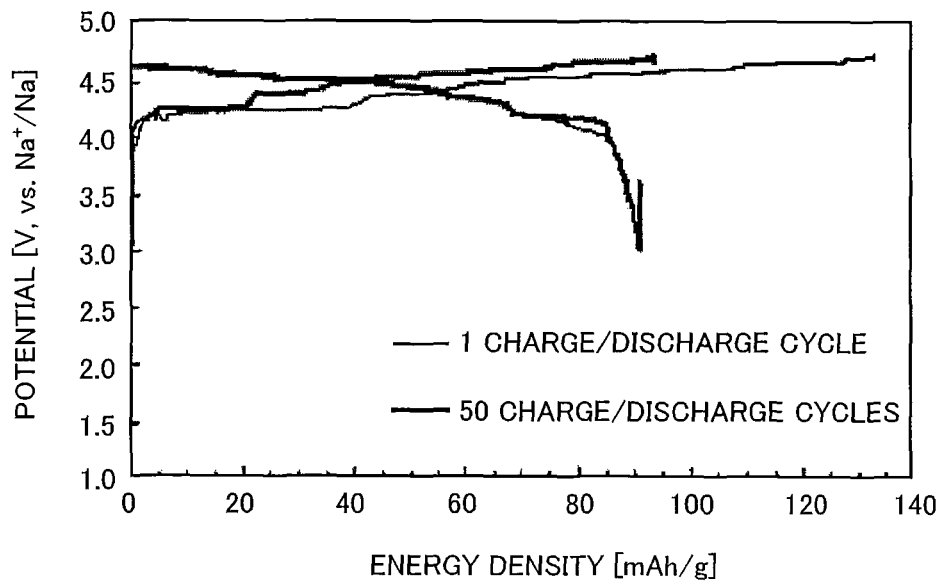
FIG. 10 shows the charge-discharge characteristics (energy density versus potential) for a positive electrode fabricated using the positive electrode active material synthesized in Example 3.
Figure 11:
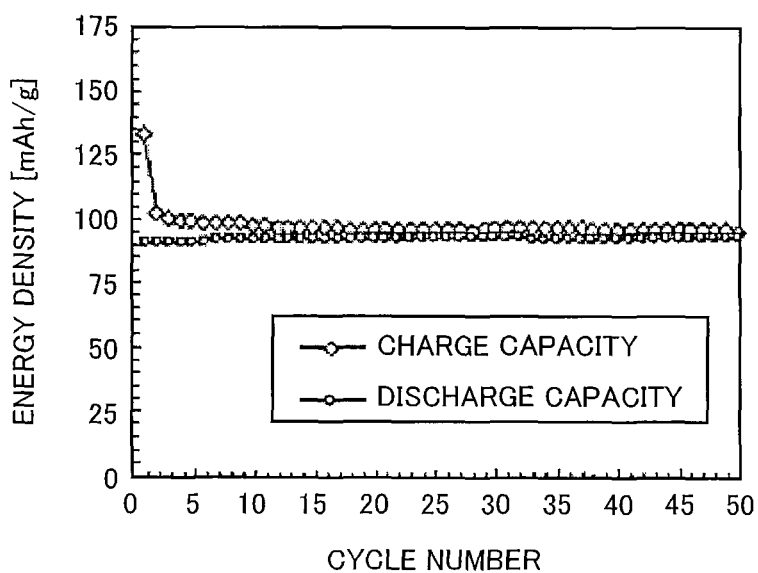
FIG. 11 shows the cycle performance (cycle number versus charge-discharge energy density) for a positive electrode fabricated using the positive electrode active material synthesized in Example 3.

Fifty charge-discharge cycles were carried out under the following conditions on the above-described test cell, and the charge-discharge characteristics were evaluated. The relationships between the energy density and the potential in the first cycle and the fiftieth cycle are shown in FIG. 10. In addition, the cycle number versus the charge energy density and the discharge energy density are shown in FIG. 11.

Potential range: 3.0 V to 4.7 V
Current density: 17 mA/g
Temperature: 25° C.

Figure 12:
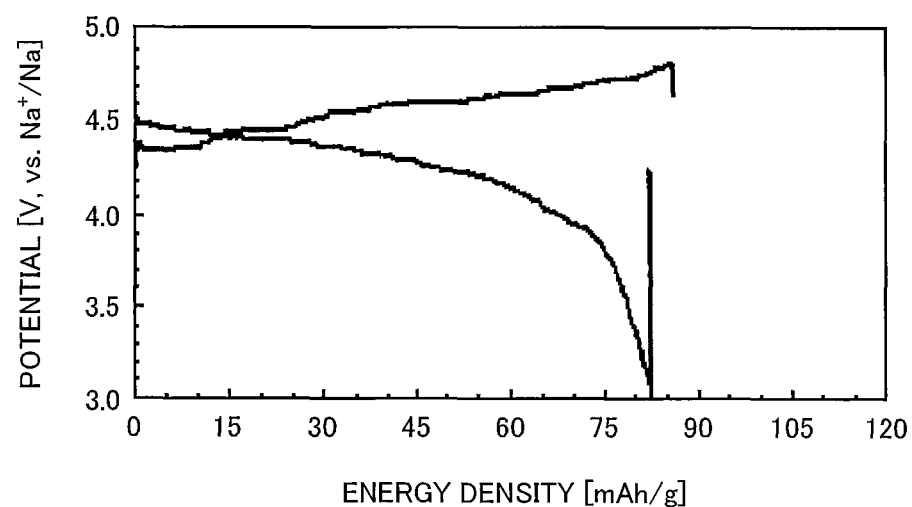
FIG. 12 shows the charge-discharge characteristics (energy density versus potential) for a positive electrode fabricated using the positive electrode active material synthesized in Example 3.

Also, charge-discharge cycling of the above test cell was carried out under the following conditions, and the charge-discharge characteristics were evaluated. The charging curve and discharging curve in the tenth cycle are shown in FIG. 12.

Potential range: 3.0 V to 4.8 V
Current density: 1700 mA/g
Temperature: 25° C.

As shown in FIG. 10, even after fifty cycles, charging and discharging is possible in the same potential region as in the first cycle. Also, compared with Example 1 and 2, an increase in the reversible capacity was confirmed. Moreover, as shown in FIG. 11, it was confirmed that, even after fifty cycles, the energy density can be retained. That is, it was found that the positive electrode active material of Example 3 has a high reversible capacity (about 90 mAh/g) in the potential region where the electrolyte solution is stable, and moreover has an excellent cycle performance. As shown in FIG. 12, even at the very high current density of 1700 mAh/g, a reversible capacity of about 82 mAh/g was exhibited. That is, given that the decrease in capacity was small in spite of the fact that the current density became 100 times higher than in the above charge-discharge cycle test at a current density of 17 mA/g, the positive electrode active material of Example 3 may be regarded as a material beneficial for achieving a higher battery input and output.

Examples 4 to 8

(Synthesis of Positive Electrode Active Materials for Sodium Batteries)

$Na_4P_2O_7$ (Na- and P-containing compound), $(CH_3COO)_2Co$ (Co-containing compound), $(CH_3COO)_2Mn$ (Mn-containing compound) and $NH_4H_2PO_4$ (P-containing compound) were added, together with glycolic acid (gelating agent), to an acidic solution (aqueous nitric acid solution) at charge amounts shown in table 1 to obtain the molar ratios of Na, Co, Mn and P shown in Table 1 and dissolved, and the solutions were stirred at 80° C. The resulting gels were fired in an open-air atmosphere at 700° C. for 15 hours.

TABLE 1

| | Molar ratio | Amount charged (mmol) | | | |
|---|---|---|---|---|---|
| | (Na:Co:Mn:P) | $Na_4P_2O_7$ | $(CH_3COO)_2Co$ | $(CH_3COO)_2Mn$ | $NH_4H_2PO_4$ |
| Example 4 | 4:3:0:4 | 10 | 30 | 0 | 20 |
| Example 5 | 4:2.7:0.3:4 | 10 | 27 | 3 | 20 |
| Example 6 | 4:2.4:0.6:4 | 10 | 24 | 6 | 20 |
| Example 7 | 4:2.2:0.8:4 | 10 | 22 | 8 | 20 |
| Example 8 | 4:2.1:0.9:4 | 10 | 21 | 9 | 20 |

The crystal structures of the synthesized materials obtained by firing in Examples 4 to 8 were analyzed with an XRD. The results are shown in Table 2.

The synthesized materials obtained in Examples 4 to 8 were confirmed to be, respectively, $Na_4Co_3(PO_4)_2P_2O_7$ (Example 4), $Na_4Co_{2.7}Mn_{0.3}(PO_4)_2P_2O_7$ (Example 5), $Na_4Co_{2.4}Mn_{0.6}(PO_4)_2P_2O_7$ (Example 6), $Na_4Co_{2.2}Mn_{0.8}(PO_4)_2P_2O_7$ (Example 7) and $Na_4Co_{2.1}Mn_{0.9}(PO_4)_2P_2O_7$ (Example 8). Also, the synthesized materials obtained in Examples 4 to 8 were confirmed to have crystal structures belonging to the space group $Pn2_1a$ shown in FIGS. 1 to 3.

TABLE 2

| | Composition | Space group |
|---|---|---|
| Example 4 | $Na_4Co_3(PO_4)_2P_2O_7$ | $Pn2_1a$ |
| Example 5 | $Na_4Co_{2.7}Mn_{0.3}(PO_4)_2P_2O_7$ | $Pn2_1a$ |
| Example 6 | $Na_4Co_{2.4}Mn_{0.6}(PO_4)_2P_2O_7$ | $Pn2_1a$ |
| Example 7 | $Na_4Co_{2.2}Mn_{0.8}(PO_4)_2P_2O_7$ | $Pn2_1a$ |
| Example 8 | $Na_4Co_{2.1}Mn_{0.9}(PO_4)_2P_2O_7$ | $Pn2_1a$ |

(Evaluation of Positive Electrode Active Materials for Sodium Batteries)

<Fabrication of Positive Electrodes>

Slurries were prepared by mixing the positive electrode active materials obtained in Examples 4 to 8 above ($Na_4Co_{3.0}(PO_4)_2P_2O_7$ (Example 4), $Na_4Co_{2.7}Mn_{0.3}(PO_4)_2P_2O_7$ (Example 5), $Na_4Co_{2.4}Mn_{0.6}(PO_4)_2P_2O_7$ (Example 6), $Na_4Co_{2.2}Mn_{0.8}(PO_4)_2P_2O_7$ (Example 7), $Na_4Co_{2.1}Mn_{0.9}(PO_4)_2P_2O_7$ (Example 8)) with carbon (conductive additive) and PVdF (binder) in the weight ratio 75 (positive electrode active material):20 (conductive additive):5 (binder), then dispersing the mixture in N-methyl-2-pyrrolidone (dispersant).

These slurries were coated onto aluminum foil (current collector), dried and rolled, thereby producing positive electrodes made up of, as successive layers, the current collector and the positive electrode active material layer.

<Fabrication of Test Cells>

Coin-type test cells were fabricated in the same way as in Example 2 using the above-described positive electrodes containing the positive electrode active materials of Examples 4 to 8.

<Method of Evaluation>

Three charge-discharge cycles were carried out on the above test cells under the following conditions, and the charge-discharge characteristics were evaluated.

Potential range: Example 4; 3.0 V to 4.7 V, Examples 5 to 8; 3.0 V to 4.8 V

Current density: 17 mA/g

Temperature: 25° C.

Figure 13:
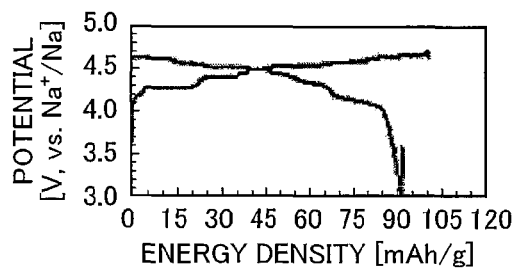
FIG. 13 shows the results of evaluations on the charge-discharge characteristics of positive electrodes fabricated using the positive electrode active materials synthesized in Examples 4 to 8.
Figure 13:
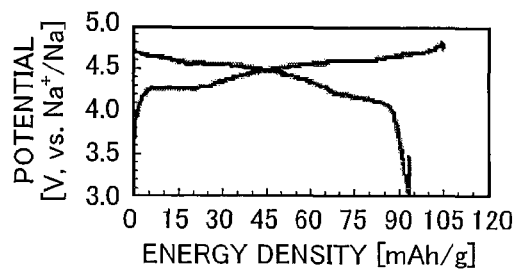
Figure 13:
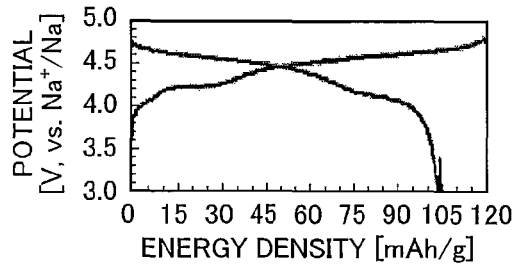
Figure 13:
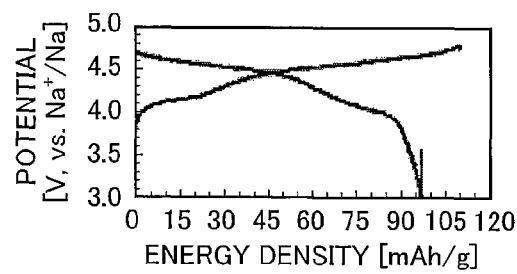
Figure 13:
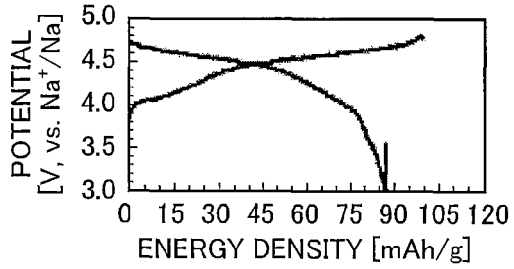

FIG. 13 shows the relationship between the energy density and the potential in the third cycle (discharge curve and charge curve). In FIG. 13, (a) shows the results for Example 4, (b) shows the results for Example 5, (c) shows the results for Example 6, (d) shows the results for Example 7, and (e) shows the results for Example 8.

Figure 14:
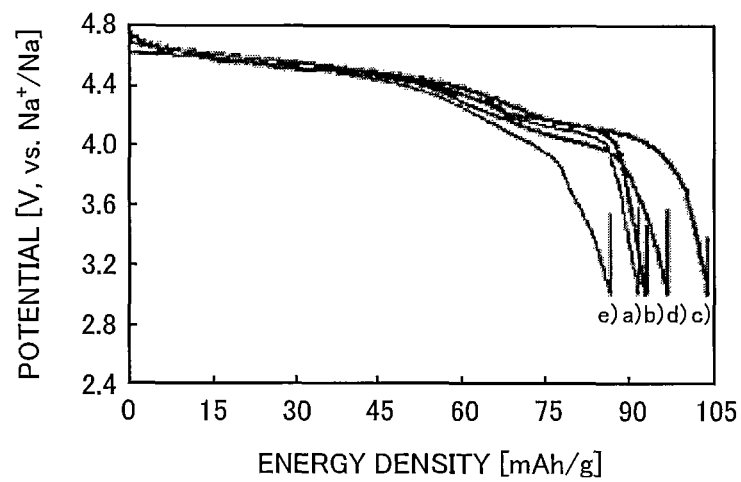
FIG. 14 shows discharge curves for positive electrodes fabricated using positive electrode active materials synthesized in Examples 4 to 8.

FIG. 14 shows the discharge curves in the third cycle for Examples 4 to 8. In FIG. 14, (a) to (e) correspond to (a) to (e) in FIG. 13.

Figure 15:
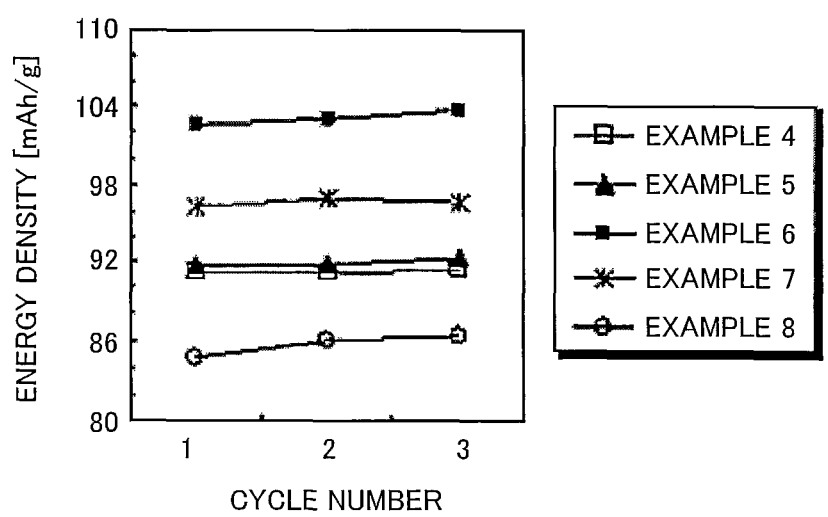
FIG. 15 shows the cycle performances of positive electrodes fabricated using the positive electrode active materials synthesized in Examples 4 to 8.

FIG. 15 shows the cycle performances (cycle number versus discharge energy density) for Examples 4 to 8.

As shown in FIGS. 13 and 14, all of Examples 4 to 8 exhibited excellent discharge capacities of 90 to 103 mAh/g in the high potential region of 3.0 to 4.8 V.

In particular, in Examples 5 to 7 where the $Co^{2+}$ sites of $Na_4Co_{3.0}(PO_4)_2P_2O_7$ were substituted with $Mn^{2+}$ in a ratio of $0.3 \leq a \leq 0.8$ in general formula $Na_4Co_{(3-a)}Mn_a(PO_4)_2(P_2O_7)$, improvements were observed in both the capacity performance and the voltage characteristics compared with Example 4 ($Na_4Co_{3.0}(PO_4)_2P_2O_7$). This is thought to be due in large part to the fact that, in cases where the ratio of $Co^{2+}$ substitution with $Mn^{2+}$ is in the above range ($0.3 \leq a \leq 0.8$), the substituted $Mn^{2+}$ can be charge compensated not only to $Mn^{2+/3+}$, but even to $Mn^{3+/4+}$ in the potential region of 4.7 V and above.

Moreover, in Example 8 where, in the general formula $Na_4Co_{(3-a)}Mn_a(PO_4)_2(P_2O_7)$, $Co^{2+}$ was substituted with $Mn^{2+}$ in the ratio a=0.9, it is conceivable that because the electron conductivity of the positive electrode active material decreased due to the $Mn^{2+}$, the battery resistance rose and, compared with Example 4 ($Na_4Co_{3.0}(PO_4)_2P_2O_7$), both the capacity performance and the voltage characteristics diminished.

Also, as shown in FIG. 15, all of Examples 4 to 8 maintained a high capacity of from about 85 to 103 mAh/g over three cycles, in addition to which the cycle performances were confirmed to be good.

Moreover, on contrasting the results from Example 3 with the results from Example 2, it was found that, compared with a positive electrode active material in which M=Co, a positive electrode active material in which M=Mn has an inferior capacity performance and a low working potential. This explains the generally held view that substituting some of the Co with Mn will lead to a decline in performance. Hence, the fact that by substituting $Co^{2+}$ with $Mn^{2+}$ in the ratio of $0.3 \leq a \leq 0.8$ within the general formula $Na_4Co_{(3-a)}Mn_a(PO_4)_2(P_2O_7)$ as in above Examples 5 to 7, both the capacity performance and the working potential can be improved is an unanticipated effect.

Examples 9 to 12

(Synthesis of Positive Electrode Active Materials for Sodium Batteries)

$Na_2P_2O_7$ (Na- and P-containing compound), $(CH_3COO)_2Co$ (Co-containing compound), $(CH_3COO)_2Mn$ (Mn-containing compound), $(CH_3COO)_2Ni$ (Ni-containing compound) and $NH_4H_2PO_4$ (P-containing compound) were added, together with glycolic acid (gelating agent), to an acidic solution (aqueous nitric acid solution) at charge amounts shown in Table 3 to obtain the molar ratios of Na, Co, Mn, Ni and P shown in Table 3 and dissolved, and the solutions were stirred at 80° C. The resulting gels were fired in an open-air atmosphere at 700° C. for 15 hours.

(Evaluation of Positive Electrode Active Materials for Sodium Batteries)

<Fabrication of Positive Electrodes>

Slurries were prepared by mixing the positive electrode active materials obtained in Examples 9 to 12 above ($Na_4Co_{3.0}(PO_4)_2P_2O_7$ (Example 9), $Na_4Co_{2.4}Mn_{0.3}Ni_{0.3}(PO_4)_2P_2O_7$ (Example 10), $Na_4Co_{1.0}Mn_{1.0}Ni_{1.0}(PO_4)_2P_2O_7$ (Example 11), $Na_4Co_{0.6}Mn_{1.2}Ni_{1.2}(PO_4)_2P_2O_7$ (Example 12)) with carbon (conductive additive) and PVdF (binder) in the weight ratio 75 (positive electrode active material): 20 (conductive additive): 5 (binder), then dispersing the mixture in N-methyl-2-pyrrolidone (dispersant).

These slurries were coated onto aluminum foil (current collector), dried and rolled, thereby producing positive electrodes made up of, as successive layers, the current collector and the positive electrode active material layer.

<Fabrication of Test Cells>

Coin-type test cells were fabricated in the same way as in Example 2 using the above-described positive electrodes containing the positive electrode active materials of Examples 9 to 12.

<Method of Evaluation>

Three charge-discharge cycles were carried out on the above test cells under the following conditions, and the charge-discharge characteristics were evaluated.

Potential range: Example 9; 3.0 V to 4.7 V, Examples 10 to 12; 3.0 V to 4.8 V

Current density: 17 mA/g

Temperature: 25° C.

FIG. 16 shows the relationship between the energy density and the potential in the third cycle (discharge curve and charge curve). In FIG. 16, (a) shows the results for Example 9, (b) shows the results for Example 10, (c) shows the results for Example 11, and (d) shows the results for Example 12.

TABLE 3

|  | Molar ratio | Amount charged (mmol) | | | | |
| --- | --- | --- | --- | --- | --- | --- |
|  | (Na:Co:Mn:Ni:P) | $Na_4P_2O_7$ | $(CH_3COO)_2Co$ | $(CH_3COO)_2Mn$ | $(CH_3COO)_2Ni$ | $NH_4H_2PO_4$ |
| Example 9 | 4:3:0:0:4 | 10 | 30 | 0 | 0 | 20 |
| Example 10 | 4:2.4:0.3:0.3:4 | 10 | 24 | 3 | 3 | 20 |
| Example 11 | 4:1:1:1:4 | 10 | 10 | 10 | 10 | 20 |
| Example 12 | 4:0.6:1.2:1.2:4 | 10 | 6 | 12 | 12 | 20 |

The crystal structures of the synthesized materials obtained by firing in Examples 9 to 12 were analyzed with an XRD. The results are shown in Table 4.

The synthesized materials obtained in Examples 9 to 12 were confirmed to be, respectively, $Na_4Co_3(PO_4)_2P_2O_7$ (Example 9), $Na_4Co_{2.4}Mn_{0.3}Ni_{0.3}(PO_4)_2P_2O_7$ (Example 10), $Na_4Co_{1.0}Mn_{1.0}Ni_{1.0}(PO_4)_2P_2O_7$ (Example 11) and $Na_4Co_{0.6}Mn_{1.2}Ni_{1.2}(PO_4)_2P_2O_7$ (Example 12). Also, the synthesized materials obtained in Examples 9 to 12 were confirmed to have crystal structures belonging to the space group $Pn2_1a$ shown in FIGS. 1 to 3.

TABLE 4

|  | Composition | Space group |
| --- | --- | --- |
| Example 9 | $Na_4Co_3(PO_4)_2P_2O_7$ | $Pn2_1a$ |
| Example 10 | $Na_4Co_{2.4}Mn_{0.3}Ni_{0.3}(PO_4)_2P_2O_7$ | $Pn2_1a$ |
| Example 11 | $Na_4Co_{1.0}Mn_{1.0}Ni_{1.0}(PO_4)_2P_2O_7$ | $Pn2_1a$ |
| Example 12 | $Na_4Co_{0.6}Mn_{1.2}Ni_{1.2}(PO_4)_2P_2O_7$ | $Pn2_1a$ |

As shown in FIG. 16, all of Examples 9 to 11 exhibited excellent discharge capacities of 90 to 95 mAh/g in the high potential region of 3.0 to 4.8 V. Example 12 shows a discharge capacity of 35 mAh/g in the high potential region of 3.0 to 4.8 V.

In particular, in Examples 10 and 11 where the $Co^{2+}$ sites of $Na_4Co_{3.0}(PO_4)_2P_2O_7$ were substituted with $Mn^{2+}$ and $Ni^{2+}$ in ratios of $0.3 \leq b \leq 1.0$ and $0.3 \leq c \leq 1.0$ in general formula $Na_4Co_{(3-b-c)}Mn_bNi_c(PO_4)_2(P_2O_7)$, improvements were observed in both the capacity performance and the voltage characteristics compared with Example 9 ($Na_4Co_{3.0}(PO_4)_2P_2O_7$). This is presumably because, in cases where the ratios of $Co^{2+}$ substitution with $Mn^{2+}$ and $Ni^{2+}$ are in the above ranges ($0.3 \leq b \leq 1.0$, $0.3 \leq c \leq 1.0$), the substituted $Mn^{2+}$ can be charge compensated not only to $Mn^{2+/3+}$, but even to $Mn^{3+/4+}$ in the potential region of 4.7 V and above, and the substituted $Ni^{2+}$ becomes $Mo^{3+}$ at a high potential, so that $Ni^{2+/3+}$ charge compensation proceeds at a high potential.

In Example 8 where, in the general formula $Na_4Co_{(3-a)}Mn_a(PO_4)_2(P_2O_7)$, $Co^{2+}$ was substituted with $Mn^{2+}$ in the ratio a (the ratio of Mn)=0.9, decreases in the capacity performance and the voltage characteristics were observed compared with Examples 5 to 7. By contrast, by substituting some portion of the Co with Ni in addition to Mn, even when b (the ratio of Mn)=1.0 as in Example 11, improvements in the capacity performance and the voltage characteristics were confirmed. From these results, although the substitution of $Co^{2+}$ with $Mn^{2+}$ is thought to bring about a decrease in the electron conductivity of the active material, it can be surmised that, by substituting $Co^{2+}$ with $Mn^{2+}$ and also with $Ni^{2+}$, which has a relatively high electron conductivity, the decrease in the electron conductivity of the active material due to $Mn^{2+}$ can be suppressed.

Also, on contrasting the results from Example 3 with the results from Examples 1 and 2, it is apparent that positive electrode active materials in which M=Ni and positive electrode active materials in which M=Mn both have capacity performances inferior to those of positive electrode active materials in which M=Co. This is most likely why it is commonly thought that substituting some of the Co with Mn or Ni will lead to a decline in performance. Hence, the fact that by substituting $Co^{2+}$ with $Mn^{2+}$ and $Ni^{2+}$ in the ratios of $0.3 \leq b \leq 1.0$ and $0.3 \leq c \leq 1.0$ within the general formula $Na_4Co_{(3-b-c)}Mn_bNi_c(PO_4)_2(P_2O_7)$ as in above Examples 10 and 11, both the capacity performance and the working potential can be improved is an unanticipated effect.

1: Negative electrode
2: Positive electrode
3: Electrolyte layer
4: Negative electrode active material layer
5: Negative electrode current collector
6: Positive electrode active material layer
7: Positive electrode current collector
8: Sodium secondary battery

The invention claimed is:

1. A positive electrode active material for a sodium battery, represented by general formula (1) or general formula (2) below:

  (1)

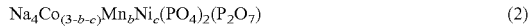  (2)

where:
"a" satisfies a condition $0.3 \leq a \leq 0.8$;
"b" satisfies a condition $0.3 \leq b \leq 1.0$; and
"c" satisfies a condition $0.3 \leq c \leq 1.0$;
wherein the positive electrode active material has a crystal structure belonging to a space group $Pn2_1a$.

2. A positive electrode active material for a sodium battery, represented by formula (1) or formula (2):

  (1)

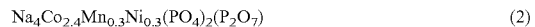  (2)

where "a" satisfies a condition $0.3 \leq a \leq 0.8$.

3. The positive electrode active material according to claim 1, wherein the positive electrode active material has a formula: $Na_4Co_{2.7}Mn_{0.3}(PO_4)_2(P_2O_7)$.

4. The positive electrode active material according to claim 1, wherein the positive electrode active material has a formula: $Na_4Co_{2.4}Mn_{0.6}(PO_4)_2(P_2O_7)$.

5. The positive electrode active material according to claim 1, wherein the positive electrode active material has a formula: $Na_4Co_{2.2}Mn_{0.8}(PO_4)_2(P_2O_7)$.

6. A method of producing the positive electrode active material for a sodium battery according to claim 1, the method comprising:
a pre-firing step of firing a starting material mixture that includes at least an Na-containing compound, a Co-containing compound, a Mn-containing compound, and a P-containing compound in an open-air atmosphere at a temperature of from 150 to 500° C.; and
a main firing step of firing the thus-obtained pre-fired material in an open-air atmosphere at a temperature of from 500 to 800° C. after implementing the pre-firing step.

7. The method of producing a positive electrode active material for the sodium battery according to claim 6, further comprising, prior to the pre-firing step, size-reducing the Na-containing compound, the Co-containing compound, the Mn-containing compound, and the P-containing compound.

* * * * *